United States Patent
Heo et al.

(10) Patent No.: US 9,509,199 B2
(45) Date of Patent: Nov. 29, 2016

(54) ENERGY HARVESTING DEVICES

(71) Applicant: Samsung Electronics Co., Ltd., Suwon-Si, Gyeonggi-Do (KR)

(72) Inventors: Jin-Suk Heo, Hwaseong-si (KR); Kyung Hoon Cho, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 546 days.

(21) Appl. No.: 14/027,458

(22) Filed: Sep. 16, 2013

(65) Prior Publication Data

US 2014/0152134 A1 Jun. 5, 2014

(30) Foreign Application Priority Data

Nov. 30, 2012 (KR) .................. 10-2012-0138215

(51) Int. Cl.
| | | |
|---|---|---|
| *H01L 41/113* | (2006.01) | |
| *H02K 21/00* | (2006.01) | |
| *H02K 99/00* | (2014.01) | |
| *H02K 53/00* | (2006.01) | |

(52) U.S. Cl.
CPC ............ *H02K 21/00* (2013.01); *H02K 57/003* (2013.01); *H02K 53/00* (2013.01)

(58) Field of Classification Search
CPC ...... F23Q 3/002; H04R 17/00; H01H 57/00; H01H 2057/006
USPC ......................................... 310/330–332, 339
See application file for complete search history.

(56) References Cited

U.S. PATENT DOCUMENTS

| | | | |
|---|---|---|---|
| 7,692,365 B2 * | 4/2010 | Churchill .............. | H02N 2/188 310/330 |
| 7,812,508 B2 | 10/2010 | Abramovich et al. | |
| 7,830,071 B2 | 11/2010 | Abramovich et al. | |
| 8,174,167 B2 * | 5/2012 | Gammaitoni ....... | H01L 41/1136 310/319 |
| 9,118,187 B1 * | 8/2015 | Islam .................... | H02K 35/02 |
| 2009/0195122 A1 | 8/2009 | Abramovich et al. | |
| 2009/0195124 A1 | 8/2009 | Abramovich et al. | |
| 2009/0195226 A1 | 8/2009 | Abramovich et al. | |
| 2010/0045111 A1 | 2/2010 | Abramovich et al. | |
| 2010/0277126 A1 * | 11/2010 | Naeimi ................ | H02K 7/1853 320/137 |
| 2011/0048133 A1 * | 3/2011 | Lin ....................... | G01P 15/09 73/514.34 |
| 2011/0193350 A1 * | 8/2011 | Rastegar ................. | F03G 7/08 290/1 C |
| 2011/0273060 A1 | 11/2011 | Chen | |
| 2011/0291526 A1 | 12/2011 | Abramovich et al. | |
| 2012/0007473 A1 | 1/2012 | Oh | |
| 2016/0013737 A1 * | 1/2016 | Yanez Villarreal .... | H02N 2/181 310/339 |

FOREIGN PATENT DOCUMENTS

| | | | | |
|---|---|---|---|---|
| JP | 08-140369 A | 5/1996 | | |
| KR | 10-0982643 B1 | 9/2010 | | |
| WO | WO-2015110093 A2 * | 7/2015 | ............ | H01L 41/113 |

* cited by examiner

*Primary Examiner* — Thomas Dougherty
(74) *Attorney, Agent, or Firm* — Harness, Dickey & Pierce, P.L.C.

(57) ABSTRACT

An energy harvesting device includes at least one first magnet configured to rotate along a first circular path in a first plane. The energy harvesting device includes at least one piezo-electric cantilever spaced apart from the first plane, the at least one piezo-electric cantilever being configured to bend in a direction substantially perpendicular to the first plane. The energy harvesting device also includes at least one second magnet coupled to the at least one cantilever and configured to overlap the at least one first magnet.

20 Claims, 32 Drawing Sheets

ENERGY HARVESTING DEVICES

RELATED APPLICATIONS

This application claims priority under 35 U.S.C. §119 to Korean Patent Application No. 10-2012-0138215 filed in the Korean Intellectual Property Office on Nov. 30, 2012, the entire contents of which are incorporated herein by reference.

BACKGROUND

Field

At least one example embodiment relates to energy harvesting devices.

Description of the Related Art

Energy harvesting, also known as power harvesting or energy scavenging, captures wasted energy (for example, solar power, thermal energy, wind energy, and kinetic energy) in everyday life and converts the captured energy into electric energy. Kinetic energy, such as continuous vibrations and discrete impacts, may be converted to the electric energy by using piezoelectricity. Piezoelectricity is an eco-friendly technology where piezo-electric materials absorb kinetic energy and convert the kinetic energy into the electric energy. The piezo-electric energy harvesting may be performed on a small scale, may have a wide selectivity of frequency environment, and high efficiency compared to other technologies that involve vibrational energy harvesting (e.g., an electrodynamic technology).

Piezo-electric energy harvesting may involve placing transducers at locations where vibrations or impacts frequently occur. The transducers may include various piezo-electric materials such as ceramics, polymers, and/or semiconductor oxides in a cantilever type, in a patch type, and/or in a diaphragm type. The structure of these transducers may be suitable for the characteristics of a vibrational environment, for example, vibrational frequency or acceleration. For example, the transducers may be roughly classified as either a vibration type or an impact type. A vibration type transducer may amplify the displacement of the transducer using resonance to increase the amount of piezo-electric power generation. An impact type transducer may cause the displacement of the transducer using force exerted by a load in a direct or indirect manner.

However, conventional energy harvesting devices have poor durability and poor power generation efficiency.

SUMMARY

At least one example embodiment relates to energy harvesting devices having improved durability and power generation efficiency.

According to at least one example embodiment, an energy harvesting device includes at least one first magnet configured to rotate along a first circular path in a first plane. The energy harvesting device may also include at least one piezo-electric cantilever spaced apart from the first plane, the at least one piezo-electric cantilever being configured to bend in a direction substantially perpendicular to the first plane. The energy harvesting device may further include at least one second magnet coupled to the at least one cantilever and configured to overlap the at least one first magnet.

According to at least one example embodiment, the at least one first magnet and the at least one second magnet are arranged such that same magnetic poles face each other.

According to at least one example embodiment, the energy harvesting device may further include at least one third magnet configured to rotate along a second circular path in a second plane substantially parallel to the first plane. The second circular path may have a center coinciding with a center of the first circular path and the at least one third magnet may be disposed opposite to the at least one first magnet with respect to the at least one second magnet and have a substantially fixed position relative to the at least one first magnet.

According to at least one example embodiment, the at least one first magnet and the at least one second magnet are arranged such that same magnetic poles face each other. The at least one third magnet and the at least one second magnet are arranged such that same magnetic poles face each other.

According to at least one example embodiment, the at least one first magnet and the at least one third magnet are arranged such that the same magnetic poles face a same direction.

According to at least one example embodiment, the energy harvesting device further includes a first rotating plate coupled with the at least one first magnet and configured to rotate around a rotational axis, and a second rotating plate configured to rotate around the rotational axis for a substantially same number of rotations as a number of rotations of the first rotating plate, the second rotating plate being disposed opposite to the first rotating plate with respect to the at least one second magnet. The energy harvesting device may also include at least one third magnet coupled to the second rotating plate and arranged along a second circular path having a diameter substantially the same as a diameter of the first circular path.

According to at least one example embodiment, the at least one second magnet includes a fourth magnet facing the at least one first magnet and a fifth magnet facing the at least one third magnet.

According to at least one example embodiment, when viewed from the rotational axis, the at least one first magnet and the at least one third magnet are arranged alternately at a regular interval, and the at least one second magnet is disposed between the at least one first magnet and the at least one third magnet.

According to at least one example embodiment, the energy harvesting device further includes a support including a ring having a center on the rotational axis, the at least one cantilever being fixed to the support.

According to at least one example embodiment, the at least one cantilever has a first end fixed to the ring and a second end extending from the ring.

According to at least one example embodiment, the at least one cantilever has a first end fixed to the ring and a second end contained within the ring.

According to at least one example embodiment, the energy harvesting device further includes a rectifier coupled to the support and configured to rectify an electric current generated by the at least one cantilever, and a capacitor coupled to the support and configured to store the rectified electric current.

According to at least one example embodiment, the energy harvesting device further includes a support including a first ring and a second ring having a common center on the rotational axis. The at least one cantilever may be fixed to the support. The at least one cantilever may include a first cantilever having a first end fixed to the first ring and a second end disposed between the first ring and the second ring, and a second cantilever having a first end fixed to the second ring and a second end disposed between the first ring and the second ring.

According to at least one example embodiment, the energy harvesting device may further include a power transmission unit configured to convert a load into rotation to be transmitted to the rotational axis.

According to at least one example embodiment, the power transmission unit may include a first converting unit configured to convert the load into rectilinear movement, and a second converting unit configured to convert the rectilinear movement into rotational movement.

According to at least one example embodiment, the first converting unit includes a pedal, and the second converter includes a rack and a pinion engaged with the rack.

According to at least one example embodiment, the power transmission unit further includes a pair of gears configured to change a number of rotations of the rotational movement.

According to at least one example embodiment, the at least one cantilever includes at least two cantilevers having different lengths.

According to at least one example embodiment, the energy harvesting device further includes a support spaced apart from the first circular path and the second circular path such that the support does not overlap first circular path and the second circular path, one end of the at least one cantilever being fixed to the support.

According to at least one example embodiment, an energy harvesting device includes a rotating plate configured to rotate around a rotational axis, and at least one first magnet on the rotating plate. The energy harvesting device may include at least one first piezo-electric cantilever spaced apart from the rotating plate. The at least one cantilever may be configured to bend in a direction substantially perpendicular to a rotation plane of the rotating plate. The energy harvesting device may include at least one second piezo-electric cantilever spaced apart from the rotating plate, the at least one cantilever being configured to bend in a direction substantially perpendicular to the rotation plane of the rotating plate and disposed opposite to the at least one first cantilever with respect to the rotating plate. The energy harvesting device may further include at least one second magnet coupled to the at least one first cantilever and overlapping a circular path along which the at least one first magnet rotates when the rotating plate rotates. The energy harvesting device may also include at least one third magnet coupled to the at least one second cantilever and overlapping the circular path along which the at least one first magnet rotate when the rotating plate rotates.

According to at least one example embodiment, the at least one cantilever includes at least two cantilevers having different lengths.

According to at least one example embodiment, an energy harvesting device may include a plurality of supports, a plurality of piezo-electric cantilevers coupled to the supports, and a plurality of rotating plates configured to rotate relative to the supports. The rotating plates and the supports may be alternately arranged. The energy harvesting device may further include a plurality of first magnets on the rotating plates, a plurality of second magnets on the cantilevers, and a power transmission unit configured to convert a load into a rotation of the rotating plates. The cantilevers may be configured to bend in a direction substantially perpendicular to a rotation plane of the rotating plates as a result of magnetic forces between the first magnets and the second magnets.

According to at least one example embodiment, each of the plurality of supports includes an inner ring and an outer ring having a common center at a rotational axis of the rotating plates, and first ones of the plurality of piezo-electric cantilevers are fixed to the inner ring.

According to at least one example embodiment, second ones of the plurality of piezo-electric cantilevers are fixed to the outer ring, and the first ones and second ones of the plurality of piezo-electric cantilevers are alternately arranged.

According to at least one example embodiment, each of the plurality of supports is in the shape of a bar and is spaced apart from the plurality of rotating plates, and the plurality of piezo-electric cantilevers extend from the plurality of bar shaped supports to overlap the rotating plates.

DETAILED DESCRIPTION OF EXAMPLE EMBODIMENTS

Figure 1:
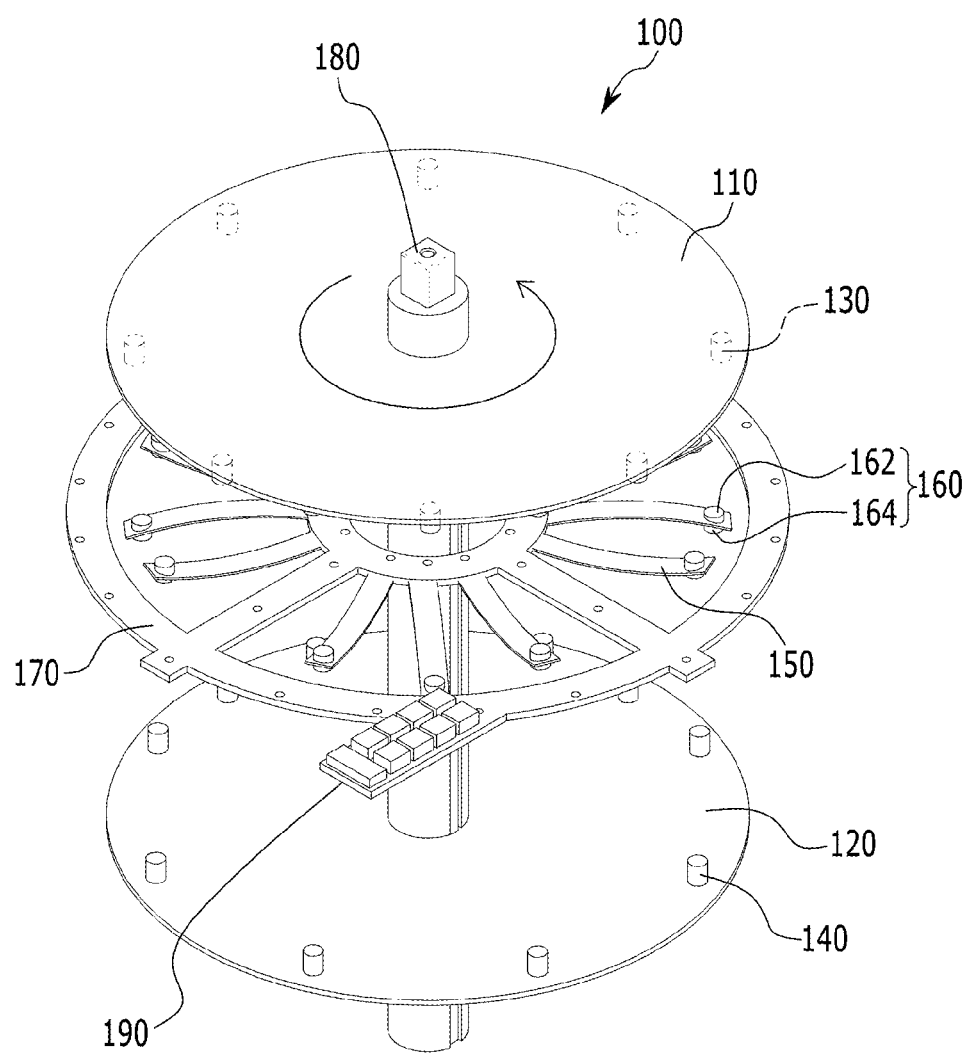
FIG. 1 is a schematic perspective view of an energy harvesting device according to at least one example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference numerals in the drawings denote like elements, and thus their description may be omitted. In the drawing, parts having no relationship with the explanation are omitted for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An energy harvesting device according to at least one example embodiment is described in detail with reference to FIG. 1 to FIG. 6.

Figure 2:
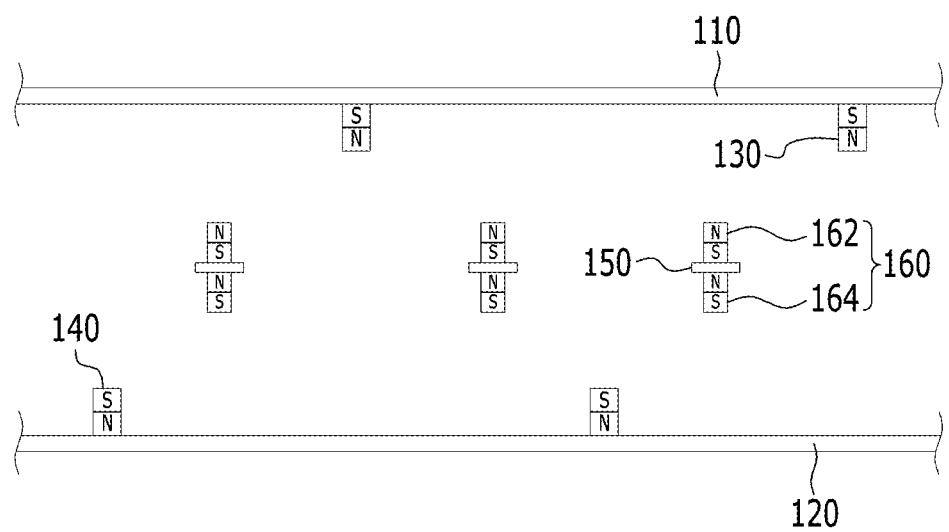
FIG. 2 is a schematic partial front view of the energy harvesting device shown in FIG. 1.
Figure 3:
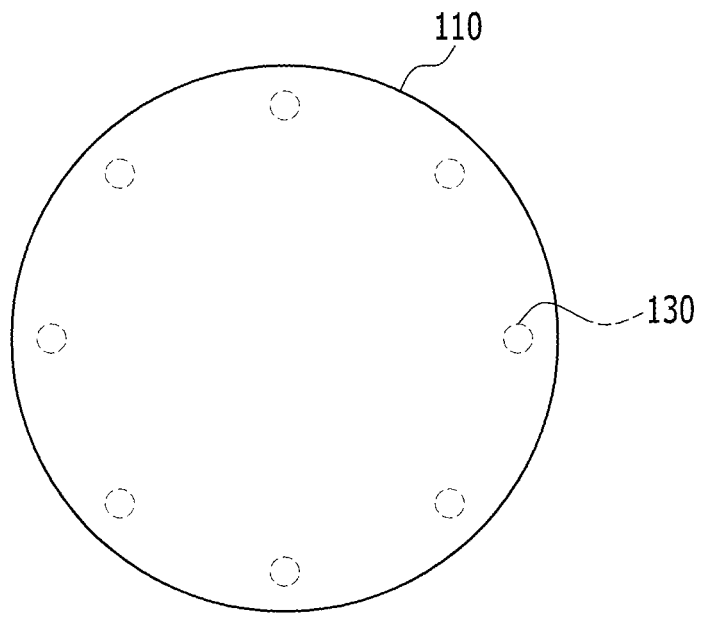
FIG. 3 is a schematic plan view of an upper rotating plate of the energy harvesting device shown in FIG. 1.
Figure 4:
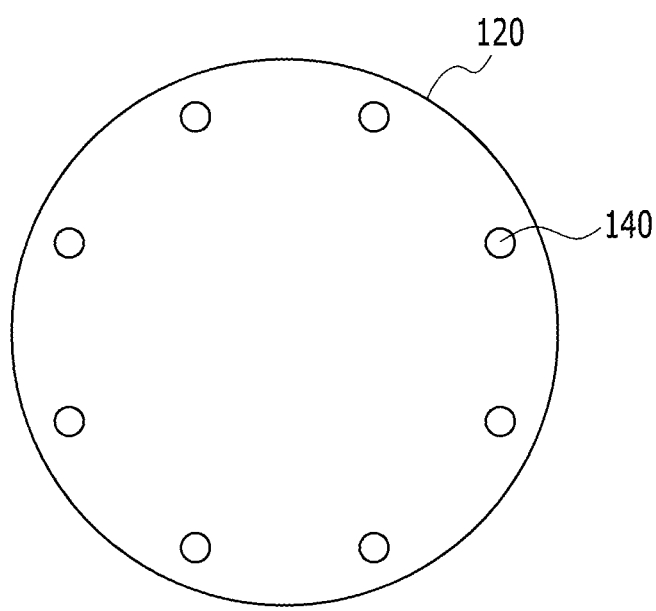
FIG. 4 is a schematic plan view of a lower rotating plate of the energy harvesting device shown in FIG. 1.
Figure 5:
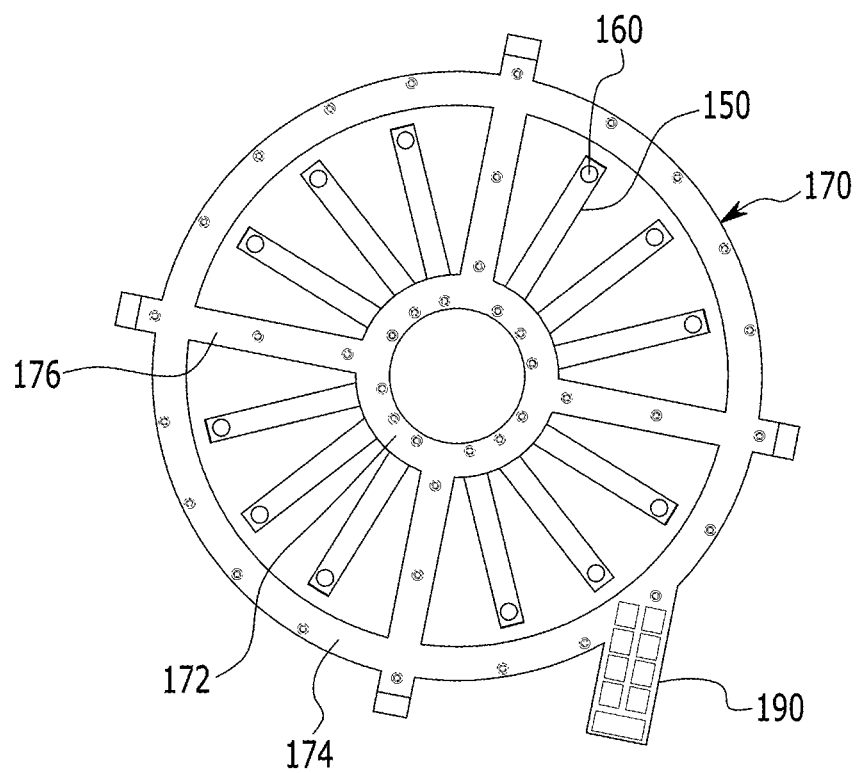
FIG. 5 is a schematic plan view of a support and cantilevers of the energy harvesting device shown in FIG. 1.
Figure 6:
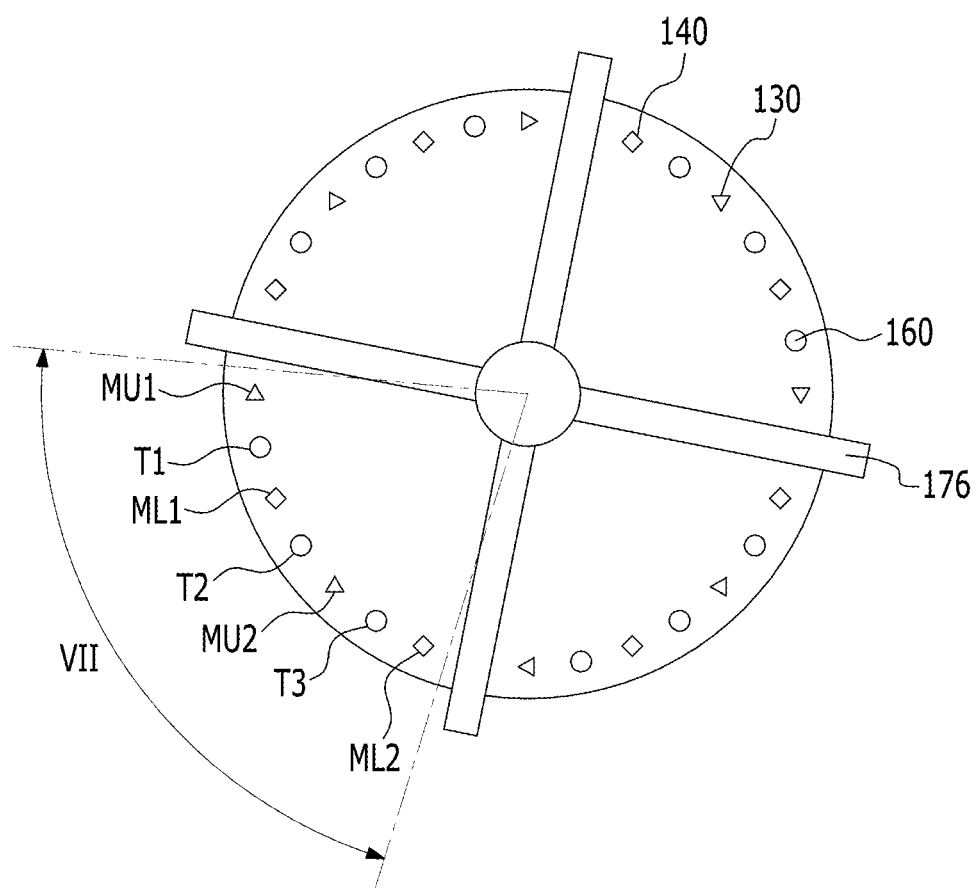
FIG. 6 schematically illustrates an arrangement of magnets of the energy harvesting device shown in FIG. 1 when the rotating plate is in a still state.

FIG. 1 is a schematic perspective view of an energy harvesting device according to at least one example embodiment. FIG. 2 is a schematic partial front view of the energy harvesting device shown in FIG. 1. FIG. 3 is a schematic plan view of an upper rotating plate of the energy harvesting device shown in FIG. 1. FIG. 4 is a schematic plan view of a lower rotating plate of the energy harvesting device shown in FIG. 1. FIG. 5 is a schematic plan view of a support and cantilevers of the energy harvesting device shown in FIG. 1. FIG. 6 schematically illustrates an arrangement of magnets of the energy harvesting device shown in FIG. 1 when the rotating plate is in a still state.

Referring to FIG. 1, an energy harvesting device 100 according to at least one example embodiment may include an upper rotating plate 110, a lower rotating plate 120, a plurality of piezo-electric cantilevers 150, a support 170, a rotational axle 180, an electric power storage 190, and a plurality of magnets 130, 140 and 160.

Referring to FIG. 2 to FIG. 4, a plurality of upper magnets 130 and a plurality of lower magnets 140 may be disposed on the upper rotating plate 110 and the lower rotating plate 120, respectively. The upper/lower magnets 130/140 may be arranged along a circular path having a center that may coincide substantially with a center of the upper/lower rotating plate 110/120. The upper magnets 130 may be attached to a lower surface of the upper rotating plate 110, and the lower magnets 140 may be attached to an upper surface of the lower rotating plate 120. Each of the upper and lower rotating plates 110 and 120 may be substantially disc-shaped. However, the shapes of the upper and lower rotating plates 110 and 120 are not limited to discs, and the upper and lower rotating plates 110 and 120 may have any shapes that can fix the magnets 130 and 140. For example, the upper and lower rotating plates 110 and 120 may have various shapes such as a circular ring or a polygon, etc.

Referring to FIG. 5, the support 170 may include a pair of concentric circular rings 172 and 174, one circular ring 172 having a smaller diameter and the other circular ring 174 having a larger diameter. The support 170 may also include a plurality of connecting bars 176 connecting the pair of concentric circular rings 172 and 174.

The piezo-electric cantilevers 150 may be coupled to the small ring 172 (i.e., an inner ring) of the support 170, and may be spread out like spokes with the small ring 172 as a hub. Each of the cantilevers 150 may be elastic or flexible, and may have a shape of a substantially straight band that can be bent upward and downward to generate electric power. A pair of central magnets 160 may be coupled to an end of each of the cantilevers 150. Referring to FIG. 2, the pair of central magnets 160 may include an upper central magnet on an upper surface of the cantilever 150 and a lower central magnet on a lower surface of the cantilever 150. The end portions of the cantilevers 150 do not touch the large ring 174 (i.e., an outer ring). The cantilevers 150 may have substantially the same length. However, the lengths of at least two of the cantilevers 150 may be different.

The support 170 may include an electric power conversion element, for example, a rectifier that rectifies the current generated by the cantilevers. According to at least one example embodiment, one rectifier may be connected to each of the cantilevers 150.

Still referring to FIG. 5, the electric power storage 190 may be coupled to the large ring 174 of the support 170. The electric power storage 190 may store the rectified electric energy, and may include a capacitor or a battery. The electric power storage 190 may be externally provided. The rectified current may be sent to and directly used in an external load instead of being stored in the electric power storage 190.

The connecting bars 176 of the support 170 may connect the small ring 172 and the large ring 174, and may be externally fixed. The figures show that four connecting bars 176 are arranged in a cross. However, the structure of the support 170 is not limited to that shown in the figures, and the support 170 may have any structure where the cantilevers 150 are coupled thereto. For example, the circular rings 172 and 174 of the support 170 may have various shapes such as polygonal rings or polygons. Although four connecting bars 176 arranged in a cross are shown in the figures, the number and the arrangement of the connecting bars 176 are not limited thereto.

According to at least one example embodiment, an end of the cantilever 150 may be fixed to the large ring 174, and the other end of the cantilever 150 where the central magnets 160 are attached may be disposed close to the small ring 172.

Referring to FIG. 1 again, the upper and lower rotating plates 110 and 120 and the support 170 may be coupled to the rotational axle 180. The centers of the upper and lower rotating plates 110 and 120 may be fixed to the rotational axle 180 such that the upper and lower rotating plates 110 and 120 rotate along with the rotational axle 180. However, the support 170 is not fixed to the rotational axle 180 although the rotational axle 180 passes through the small ring 172 of the support 170, and thus the support 170 may maintain its still state when the rotational axle 180 is rotating.

According to at least one example embodiment, the upper and lower rotating plates 110 and 120 are not fixed to the rotational axle 180, and the support 170 may be fixed to the rotational axle 180. In this case, the central magnets 160 may rotate while the upper and lower magnets 130 and 140 do not rotate.

A distance between the upper rotating plate 110 and the lower rotating plate 120 may be greater than twice a maximum vertical displacement of the cantilevers 150, i.e., a maximum vertical distance measured from an equilibrium position of the cantilevers 150.

Referring to FIG. 6, the magnets 130, 140 and 160 may be disposed at positions spaced apart from the centers of the rotating plates 110 and 120 and the support 170 by substantially the same distance. Therefore, the upper and lower magnets 130 and 140 may rotate along circular paths having substantially the same diameter, and the central magnets 160 may overlap the circular paths. The upper magnets 130 may be arranged along a periphery of the upper rotating plate 110 by a substantially regular spacing, and the lower magnets 140 may be arranged along a periphery of the lower rotating plate 120 by a substantially regular spacing. The central magnets 160 and the connecting bars 176 may be arranged along a periphery of the support 170 by a substantially regular spacing as a whole.

The number of the upper magnets 130 may be equal to the number of the lower magnets 140, and the number of the upper and lower central magnets 162 and 164 may be greater than the number of the upper and lower magnets 130 and 140. For example, the figures show eight upper magnets 130, eight lower magnets 140, twelve upper central magnets 162, and twelve lower central magnets 164. However, the number of the magnets 130, 140, 162 and 164 is not limited thereto.

The total number (N) of the upper and lower central magnets 162 and 164 may be determined by the resonance frequency (F) of a transducer or an energy converter that is a combination of the central magnets 160 and the cantilevers 150, a time duration (T) of the rotation of the rotational axle 180 when an external force is exerted, and a number of rotations (R) of the rotating plates 110 and 120. For example, N=F×T/R.

Since the upper and lower rotating plates 110 and 120 are fixed to the rotational axle 180, relative positions between the upper magnets 130 and the lower magnets 140 do not change. Since the central magnets 160 are fixed while the upper and lower magnets 130 and 140 rotate along with the rotational axle 180, relative positions between the central magnets 160 and the upper and lower magnets 130 and 140 may change. The positions of the upper magnets 130 and the lower magnets 140 are not coincident. According to at least one example embodiment, the upper magnets 130 and the lower magnets 140 may be arranged alternately by a substantially regular distance as shown in FIG. 6. Referring to FIG. 6, in a still state, the central magnets 160 may be located in the middle between the upper magnets 130 and the lower magnets 140, and the connecting bars 176 of the support 170 may be located in the middle between the upper magnets 130 and the lower magnets 140.

If the sum of the number of the upper magnets 130 and the number of the lower magnets 140 is denoted by N, the angular positions $\theta_U$ and $\theta_L$ of the upper and lower magnets 130 and 140 may be expressed by, for example, $$\theta_U = \frac{360° \times n}{N/2},$$

and $$\theta_L = \frac{360° \times n}{N/2} + \frac{360°}{N},$$

where n=0, 1, . . . , N/2−1.

The angular position $\theta_1$ of the central magnets 160 may be expressed by, for example, $$\theta_1 = \frac{360° \times m}{N} + \frac{360°}{2N},$$

where m=0, 1, . . . , N−1.

According to at least one example embodiment, the upper/lower magnets 130/140 and the central magnets 160 may be arranged such that the same magnetic poles may face each other. In addition, the upper magnets 130 and the lower magnets 140 may be arranged such that the same magnetic poles face the same direction. For example, referring to FIG. 2, the north poles of the upper magnets 130 may face downward, and the north poles of the upper central magnets 162 may face upward. The south poles of the lower magnets 140 may face upward, and the south poles of the lower central magnets 164 may face downward. In this case, the force between the upper/lower magnets 130/140 and the central magnets 160 is repulsive.

According to at least one other example embodiment, the upper and lower magnets 130 and 140 and the central magnets 160 may be arranged such that opposite magnetic poles may face each other. For example, the north poles of the upper magnets 130 may face downward, the south poles of the upper central magnets 162 may face upward, the south poles of the lower magnets 140 may face upward, and the north poles of the lower central magnets 164 may face downward. In this case, the force between the upper/lower magnets 130/140 and the central magnets 160 is attractive.

However, the arrangement of the magnets 130, 140 and 160 is not limited thereto, and the magnets 130, 140 and 160 may have various arrangements.

Now, operation of the energy harvesting device 100 is described in detail with reference to FIG. 6 to FIG. 14.

Figure 7:
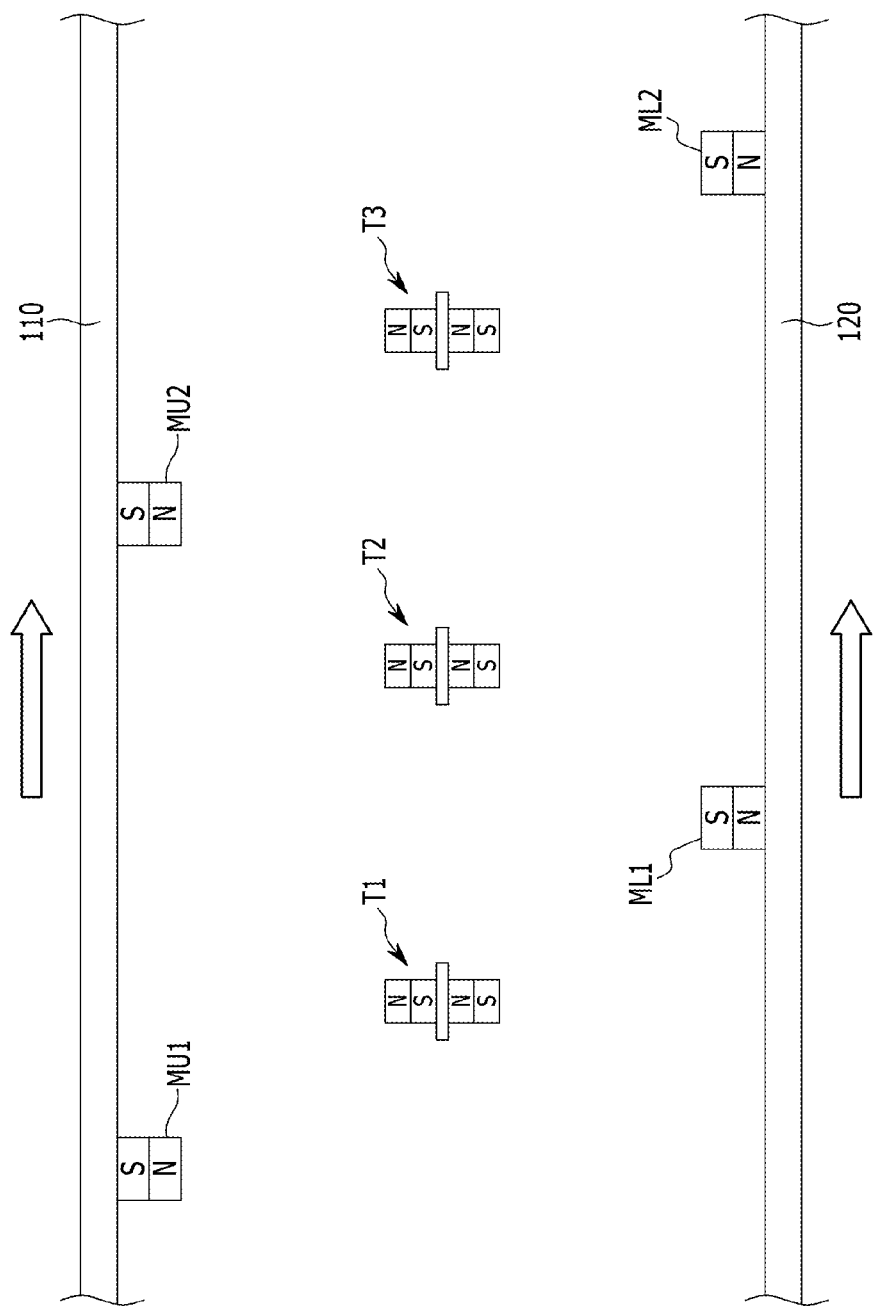
FIG. 7 is a schematic lateral view of the energy harvesting device shown in FIG. 1 in the state shown in FIG. 6 taken along a curve VII.
Figure 8:
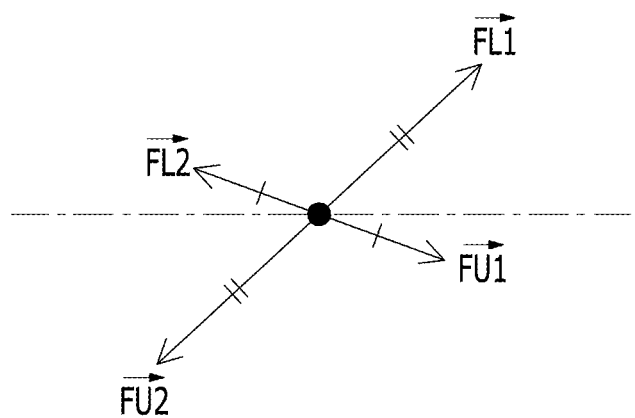
FIG. 8 schematically illustrates forces exerted on a cantilever of the energy harvesting device shown in FIG. 1 in the state shown in FIG. 6.
Figure 9:
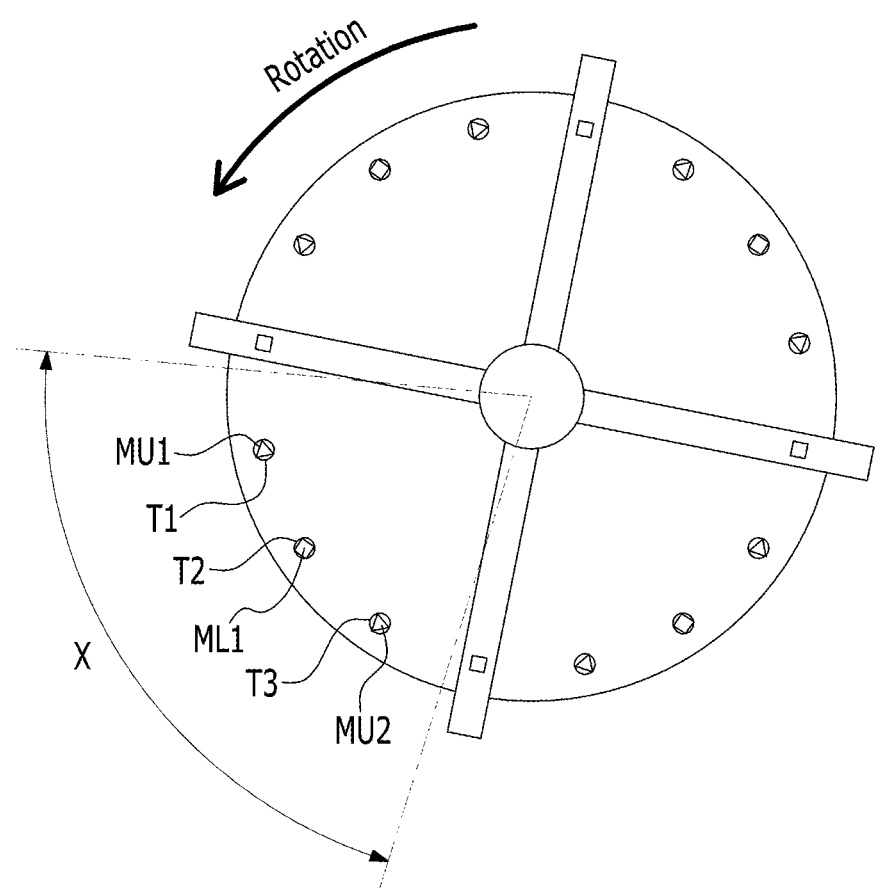
FIG. 9 schematically illustrates an arrangement of magnets at a time during the rotation of a rotating plate of the energy harvesting device shown in FIG. 1.
Figure 10:
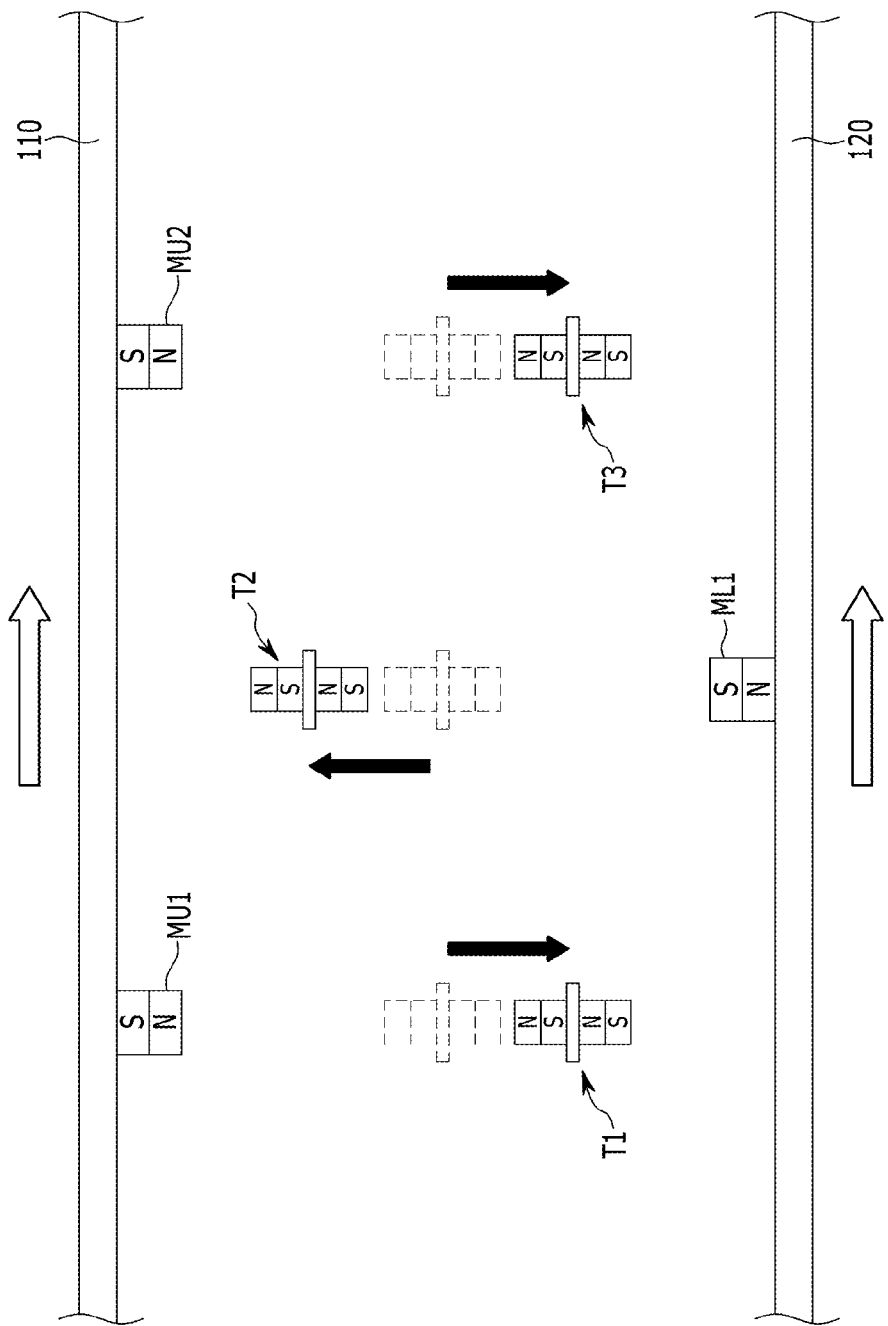
FIG. 10 is a schematic lateral view of the energy harvesting device shown in FIG. 1 in the state shown in FIG. 9 taken along a curve X.
Figure 11:
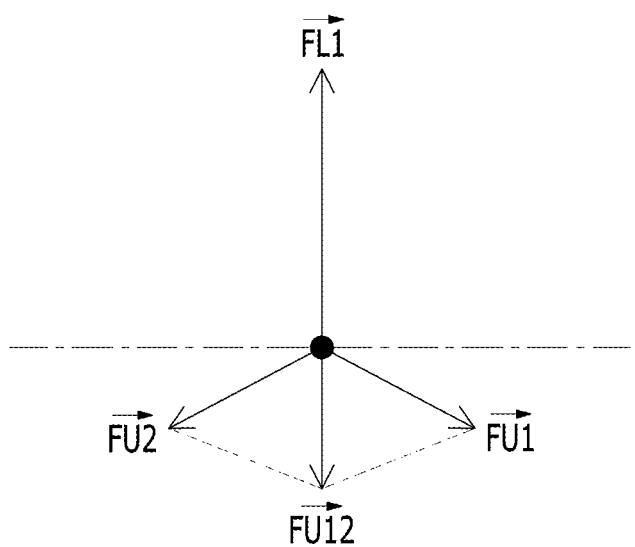
FIG. 11 schematically illustrates forces exerted on the cantilever of the energy harvesting device shown in FIG. 1 in the state shown in FIG. 9.
Figure 12:
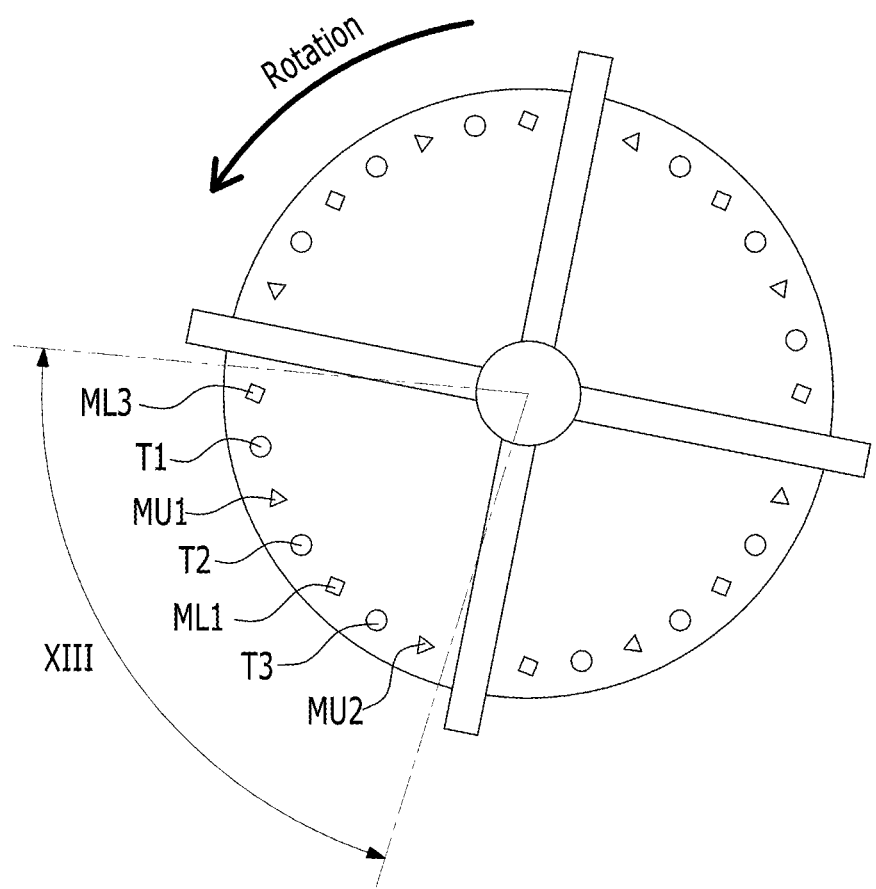
FIG. 12 schematically illustrates the arrangement of the magnets at another time during the rotation of the rotating plate of the energy harvesting device shown in FIG. 1.
Figure 13:
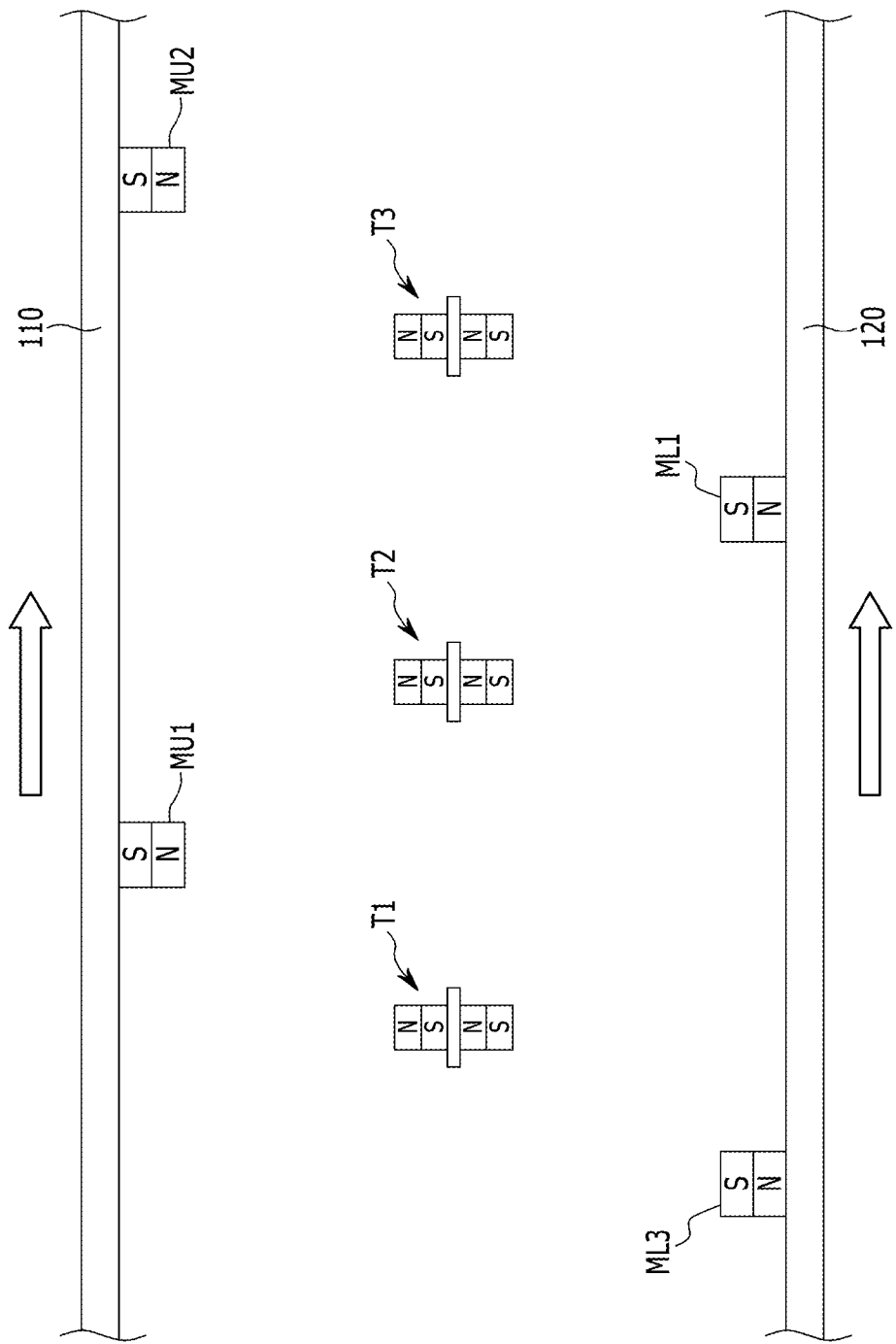
FIG. 13 is a schematic lateral view of the energy harvesting device shown in FIG. 1 in the state shown in FIG. 10 taken along a curve XIII.
Figure 14:
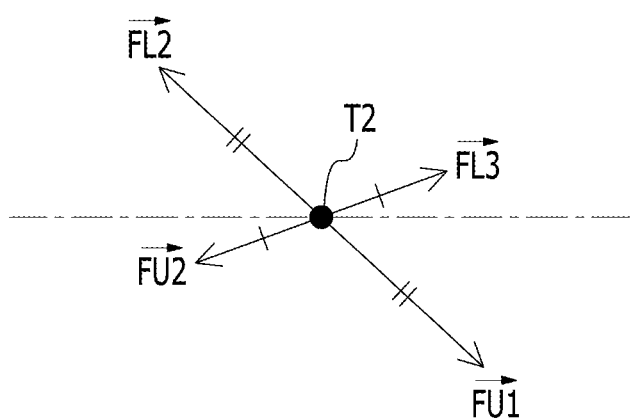
FIG. 14 schematically illustrates forces exerted on the cantilever of the energy harvesting device shown in FIG. 1 in the state shown in FIG. 12.

FIG. 7 is a schematic lateral view of the energy harvesting device shown in FIG. 1 in the state shown in FIG. 6 taken along a curve VII, and FIG. 8 schematically illustrates forces exerted on a cantilever of the energy harvesting device shown in FIG. 1 in the state shown in FIG. 6. FIG. 9 schematically illustrates an arrangement of magnets at a time during the rotation of a rotating plate of the energy harvesting device shown in FIG. 1. FIG. 10 is a schematic lateral view of the energy harvesting device shown in FIG. 1 in the state shown in FIG. 9 taken along a curve X. FIG. 11 schematically illustrates forces exerted on the cantilever of the energy harvesting device shown in FIG. 1 in the state shown in FIG. 9. FIG. 12 schematically illustrates the arrangement of the magnets at another time during the rotation of the rotating plate of the energy harvesting device shown in FIG. 1. FIG. 13 is a schematic lateral view of the energy harvesting device shown in FIG. 1 in the state shown in FIG. 10 taken along a curve XIII. FIG. 14 schematically illustrates forces exerted on the cantilever of the energy harvesting device shown in FIG. 1 in the state shown in FIG. 12.

In FIG. 6 to FIG. 14, MU1 and MU2 denote upper magnets 130, and ML1, ML2 and ML3 denote lower magnets 140. T1, T2 and T3 denote transducers that are combinations of the central magnets 160 and the piezo-electric cantilever 150. The positions of the transducers T1, T2 and T3 are expressed relative to the positions of the central magnets 160.

As described above, the upper magnets 130 and the lower magnets 140 of the energy harvesting device 100 shown in FIG. 1 to FIG. 5 are arranged in an alternate manner such that the same poles of the upper/lower magnets 130/140 and the central magnets 160 face each other. Then, repulsive force may be generated between the upper/lower magnets 130/140 and the central magnets 160.

Referring to FIG. 6 and FIG. 7, when the rotating plates 110 and 120 are in a still state without rotating, the transducers T1, T2 and T3 may be placed in the middle between the upper magnets MU1 and MU2 and the lower magnets ML1 and ML2.

In this state, the forces exerted on the transducers T1, T2 and T3 by the upper magnets MU1 and MU2 and the lower magnets ML1 and ML2 may be in equilibrium. For example, the upper magnet MU2 and the lower magnet ML1 are the closest to the center transducer T2 among the three transducers T1, T2 and T3. Referring to FIG. 8, a force FU2 exerted on the transducer T2 by the upper magnet MU2 may be substantially antiparallel to a force FL1 exerted on the transducer T2 by the lower magnet ML1, and the forces FU2 and FL1 may have substantially the same magnitude. Forces FU1 and FL2 exerted on the transducer T2 by two next nearest magnets MU1 and ML2 that are the next nearest to the transducer T2 may be substantially antiparallel and may have substantially the same magnitude.

Therefore, the transducers T1, T2 and T3 may maintain their stable states in the state shown in FIG. 6 to FIG. 8.

When the rotational axle 180 starts rotation by external impact or vibration, the upper and lower rotating plates 110 and 120 may also rotate and thus, positions of the upper and lower magnets MU1, MU2, ML1 and ML2 relative to the transducers T1, T2 and T3 may be changed. FIG. 9 to FIG. 14 show the upper and lower magnets MU1, MU2, ML1 and ML2 and the transducers T1, T2 and T3 in some positions during the counterclockwise rotation of the rotational axle 180.

Referring to FIG. 9 and FIG. 10, the upper and lower magnets MU1, MU2, ML1 and ML2 in the states shown in FIG. 6 to FIG. 8 may move counterclockwise (or in a right direction in FIG. 10) to overlap the transducers T1, T2 and T3. At this time, the transducers T1, T2 and T3 may overlap either the upper magnets MU1 and MU2 or the lower magnets ML1 and ML2 such that the net force exerted on the transducers T1, T2 and T3 is either downward or upward. For example, the transducer T2 may overlap the lower magnet ML1 and thus, the lower magnet ML1 is the closest to the transducer T2. Referring to FIG. 11, the force FL1 exerted on the transducer T2 by the closest magnet, i.e., the lower magnet ML1, may be greater than the resultant force FU12 of the forces FU1 and FU2 exerted on the transducer T2 by the two upper magnets MU1 and MU2 that are next-nearest magnets, and the force FL1 may point upward.

Therefore, the transducer T2 may be bent upward as shown in FIG. 10. According to the same principle, the transducers T1 and T3 may be bent downward.

Referring to FIG. 12 and FIG. 13, the upper and lower magnets MU1, MU2, ML1 and ML2 in the states shown in FIG. 9 to FIG. 11 may move counterclockwise (or in a right direction) such that the transducers T1, T2 and T3 may be placed in the middle between the upper magnets MU1 and MU2 and the lower magnets ML3 and ML1. In this state, the forces exerted on the transducers T1, T2 and T3 by the upper magnets MU1 and MU2 and the lower magnets ML3 and ML1 may be in equilibrium like in the state shown in FIG. 6 to FIG. 8. For example, referring to FIG. 14, the upper magnet MU1 and the lower magnet ML1 may be the closest to the transducer T2. A force FU1 exerted on the transducer T2 by the upper magnet MU1 may be substantially antiparallel to a force FL1 exerted on the transducer T2 by the lower magnet ML1, and the forces FU1 and FL1 may have substantially the same magnitude. In addition, forces FU2 and FL3 exerted on the transducer T2 by two next nearest magnets MU2 and ML3 that are the next nearest to the transducer T2 may be substantially antiparallel and may have substantially the same magnitude to be cancelled.

Therefore, the transducers T1, T2 and T3 may return to their initial equilibrium positions as shown in FIG. 13.

The transducers T1, T2 and T3 may repeat bending and unbending during the rotation of the rotating plates 110 and 120 to produce periodic current, which may be entered into the rectifiers on the support 170. The rectifier may rectify the current, for example, in a manner of bridge full-wave rectification and send the rectified current to the electric power storage 190 or an external storage or load.

The energy harvesting device 100 according to at least one example embodiment may generate electric current using the rotation of the rotating plates 110 and 120 as described above. Alternatively, the energy harvesting device 100 may produce electric energy when impact or vibration does not cause rotation of the rotating plates 110 and 120, but may cause the vibration of the energy harvesting device 100 in a vertical direction. That is, when the energy harvesting device 100 vibrates in the vertical direction, the cantilevers 150 may also vibrate in the vertical direction due to the weight of the central magnets 160. Once resonance occurs, the vibration with a sufficiently large magnitude may continue for a sufficient duration to produce electric current.

The resonance frequency of the transducers T1, T2 and T3 may be determined by structures of the transducers T1, T2 and T3. When the period of the vertical motion of the transducers T1, T2 and T3 is very close to or substantially the same as the resonance frequency, the displacement of the transducers T1, T2 and T3 becomes very large to produce large electric power. Therefore, average force and/or impact, which is applied to the energy harvest device 100 in a circumstance where the energy harvest device 100 may be installed, and average number of rotations of the rotating plates 110 due to the force or impact may be predicted. Thereafter, the structure of the transducers T1, T2 and T3 including the mass of the central magnets 160 and/or the length of the cantilevers 150 may be determined based on the prediction.

According to at least one example embodiment, a plurality of piezo-electric cantilevers having different structures may be provided to prepare for impacts and/or vibrations of various magnitudes.

Figure 15:
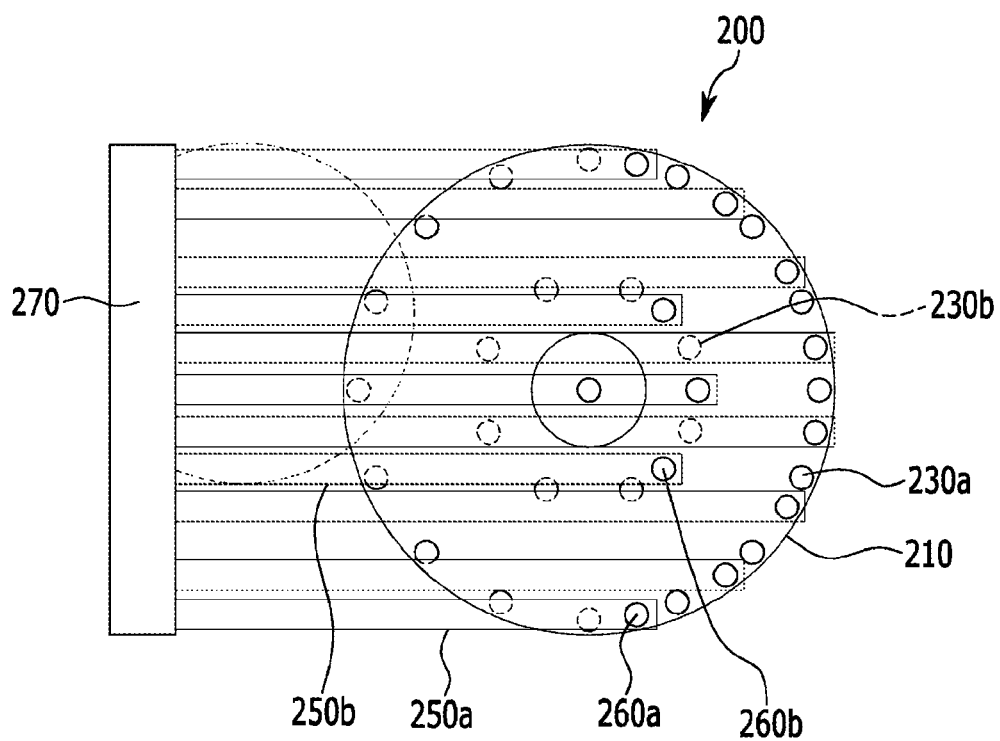
FIG. 15 is a schematic plan view of an energy harvesting device according to at least one example embodiment.

FIG. 15 is a schematic plan view of an energy harvesting device according to at least one example embodiment.

Referring to FIG. 15, an energy harvesting device 200 may include at least one rotating plate 210, a plurality of piezo-electric cantilevers 250a and 250b, a support 270, and a plurality of magnets 230a, 230b, 260a and 260b.

The disc-shaped rotating plate 210 may be fixed to a rotating axle (not shown), and the magnets 230a and 230b coupled to the rotating plate 210 may be arranged along a pair of concentric circular paths having a center that coincides with a center of the rotating plate 210. In other words, the magnets 230a and 230b on the rotating plate 210 may include first magnets 230a provided along a larger one of among the two concentric circular paths and second magnets 230b provided along a smaller one of the two concentric circular paths.

The support 270, which may have a substantially straight flat surface (i.e., in the shape of a bar), may be located near the rotating plate 210. The support 270 may be externally fixed, and may include a circuit board.

The piezo-electric cantilevers 250a and 250b may be fixed to the support 270 in a row, and may overlap the rotating plate 210. The magnets 260a and 260b may be coupled to end portions of the piezo-electric cantilevers 250a and 250b. The magnets 260a and 260b may include third magnets 260a and fourth magnets 260b. The third magnets 260a may be provided along the large circular path where the first magnets 230a on the rotating plate 210 are disposed, and the fourth magnets 260b may be provided along the small circular path where the second magnets 230b on the rotating plate 210 are disposed.

In other words, one end portions of the cantilevers 250a and 250b may extend out of the rotating plate 210 to be fixed and arranged in a straight row, and the other end portions of the cantilevers 250a and 250b that are coupled with the magnets 260a and 260b may be arranged in an arc, like the arrangement of the magnets 260a and 260b. Therefore, the lengths of the cantilevers 250a and 250b may be different from each other. In addition, first cantilevers 250a coupled with the third magnets 260a and second cantilevers 250b coupled with the fourth magnets 260b may have different lengths, and the first cantilevers 250a and the second cantilevers 250b may be arranged in an alternate manner.

As described above, the resonance frequency of a transducer including a piezo-electric cantilever 250a or 250b and a magnet 260a or 260b may depend on the length of the piezo-electric cantilever 250a or 250b. Therefore, it is desirable to employ a transducer having a resonance frequency fit for an impact of an arbitrary strength and a corresponding number of rotations of the rotating plate 210 since the piezo-electric cantilevers 250a and 250b according to at least one example embodiment may have various lengths. In addition, external vibration that does not cause the rotation of the rotating plate 210 may still contribute to power generation by resonance. Therefore, the power generation efficiency of the energy harvesting device may be increased.

The energy harvesting devices 100 and 200 according to at least one example embodiment are non-contact devices, which have high durability and high power generation efficiency.

An energy harvesting device according to at least one example embodiment is described in detail with reference to with reference to FIG. 16 to FIG. 34.

Figure 16:
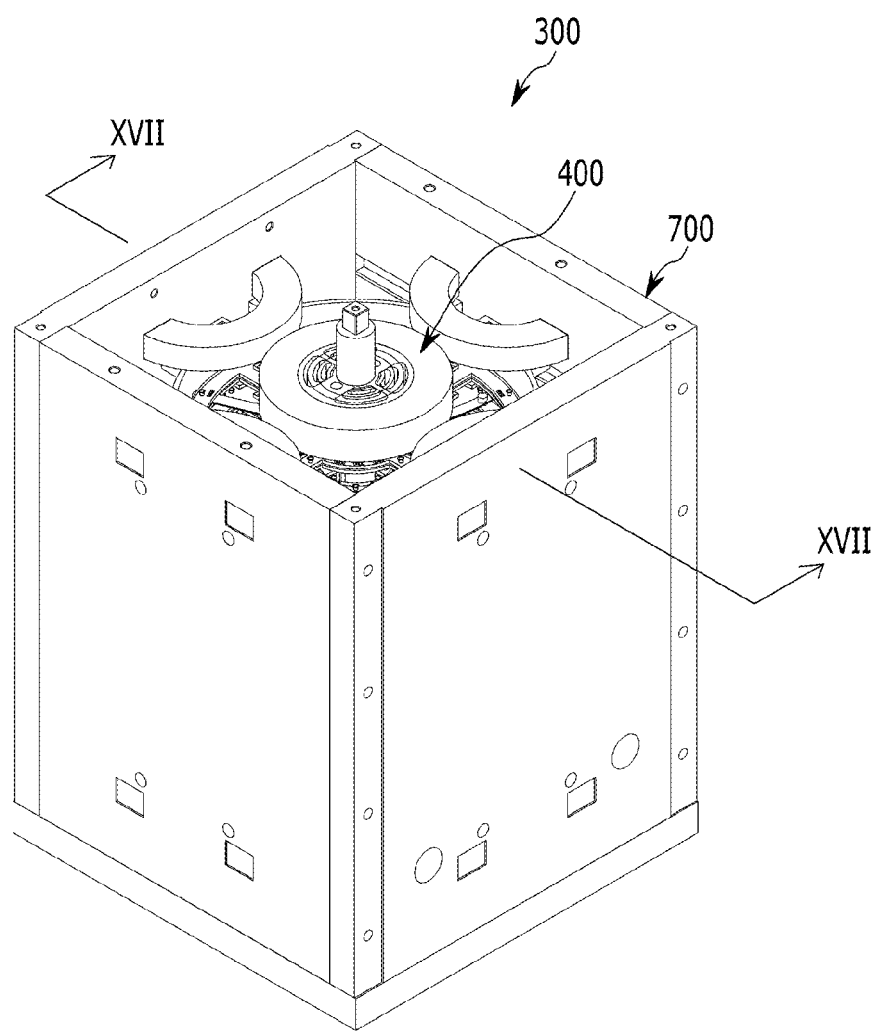
FIG. 16 is a schematic perspective view of an energy harvesting device according to at least one example embodiment.
Figure 17:
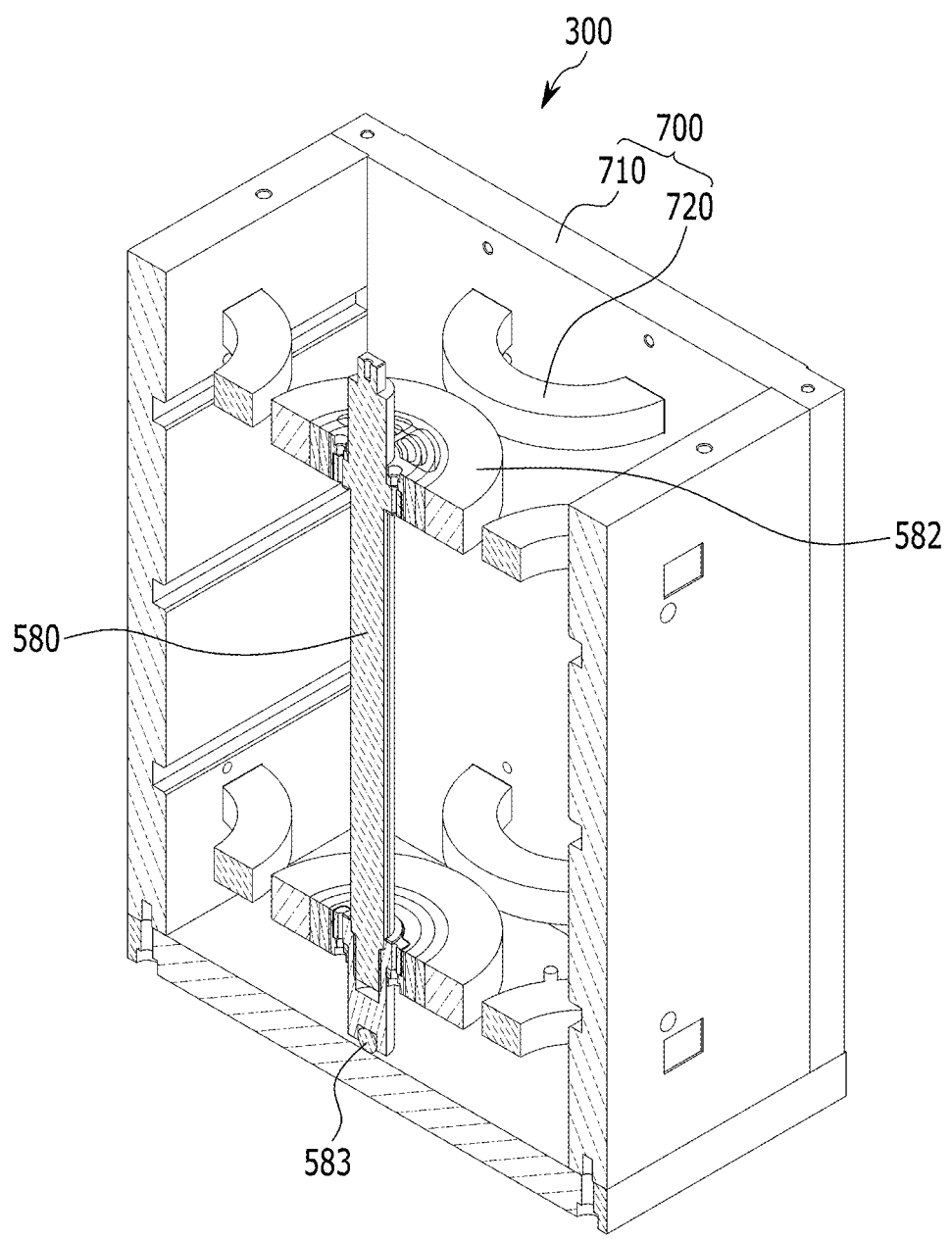
FIG. 17 is a schematic sectional view of the energy harvesting device shown in FIG. 16 taken along the line XVII-XVII.
Figure 18:
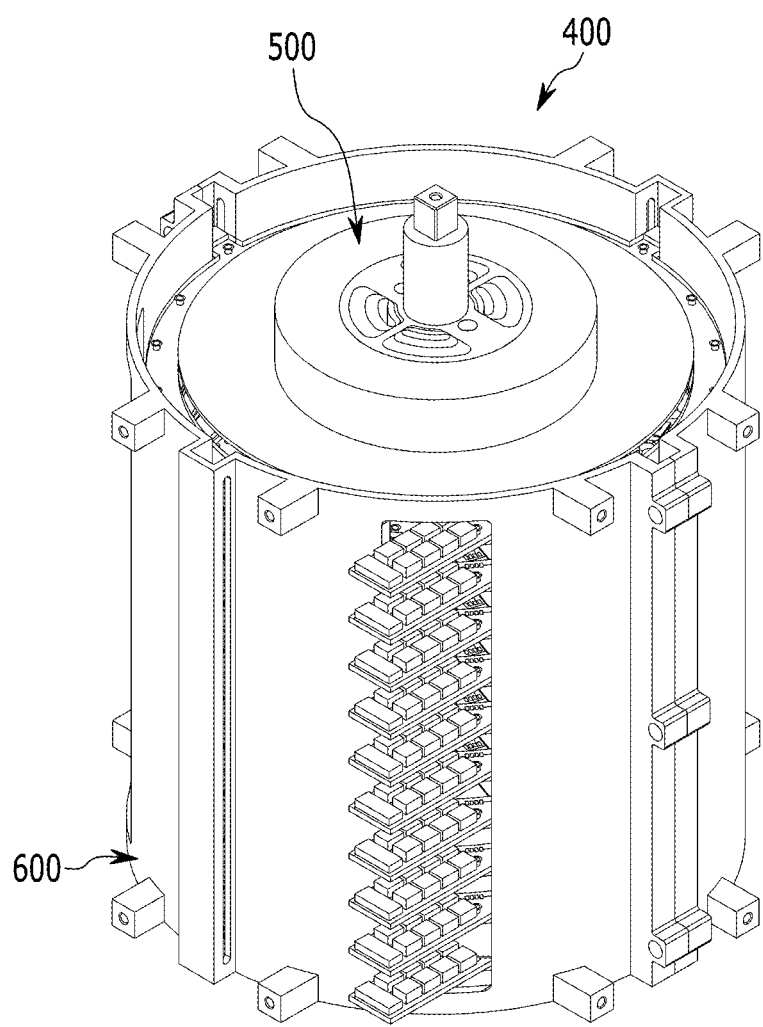
FIG. 18 and FIG. 19 are schematic perspective views of a power generation module of the energy harvesting device shown in FIG. 16.
Figure 19:
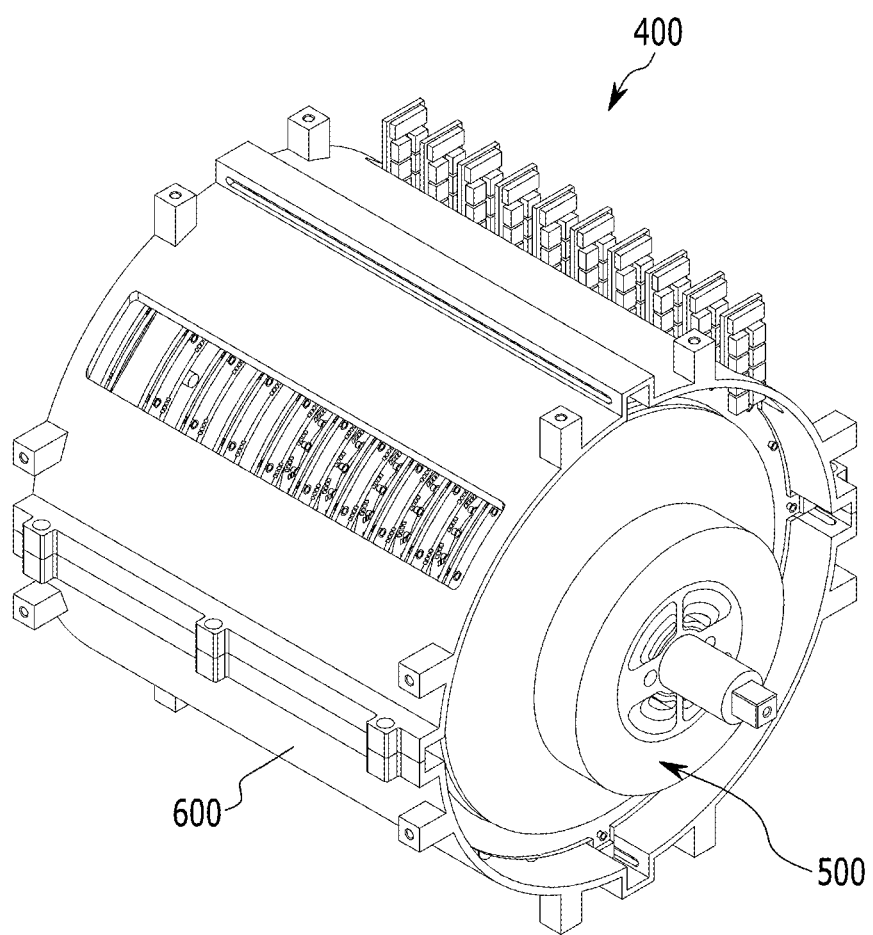
Figure 20:
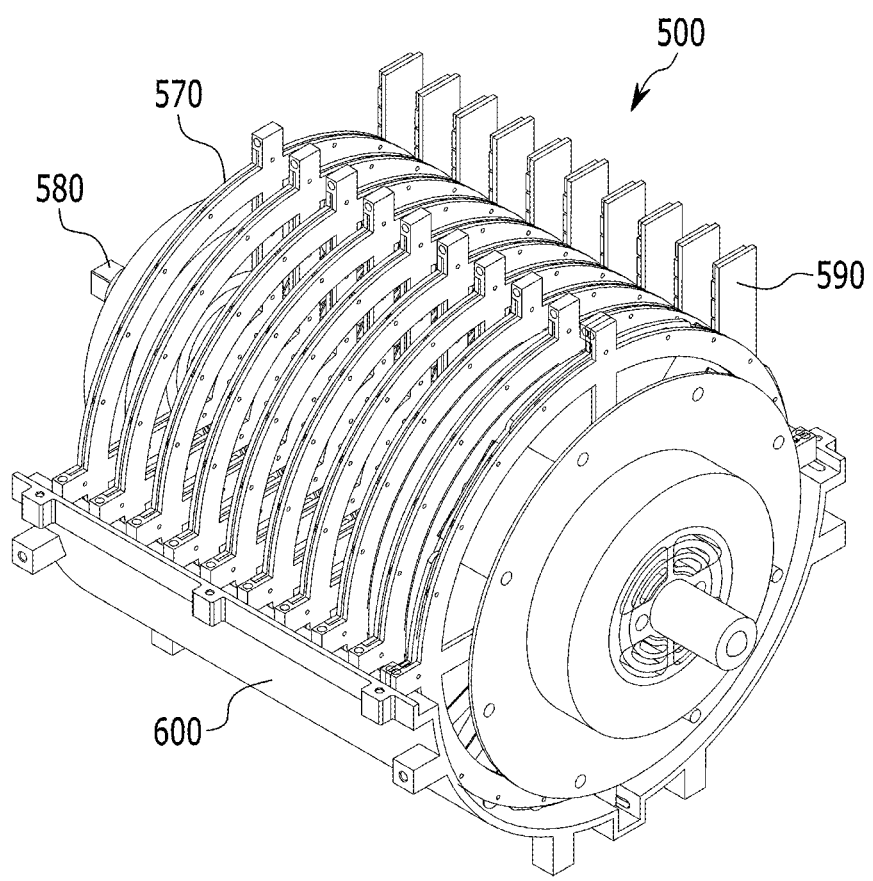
FIG. 20 is a schematic perspective view of the power generation module shown in FIG. 18 and FIG. 19 without a cover.
Figure 21:
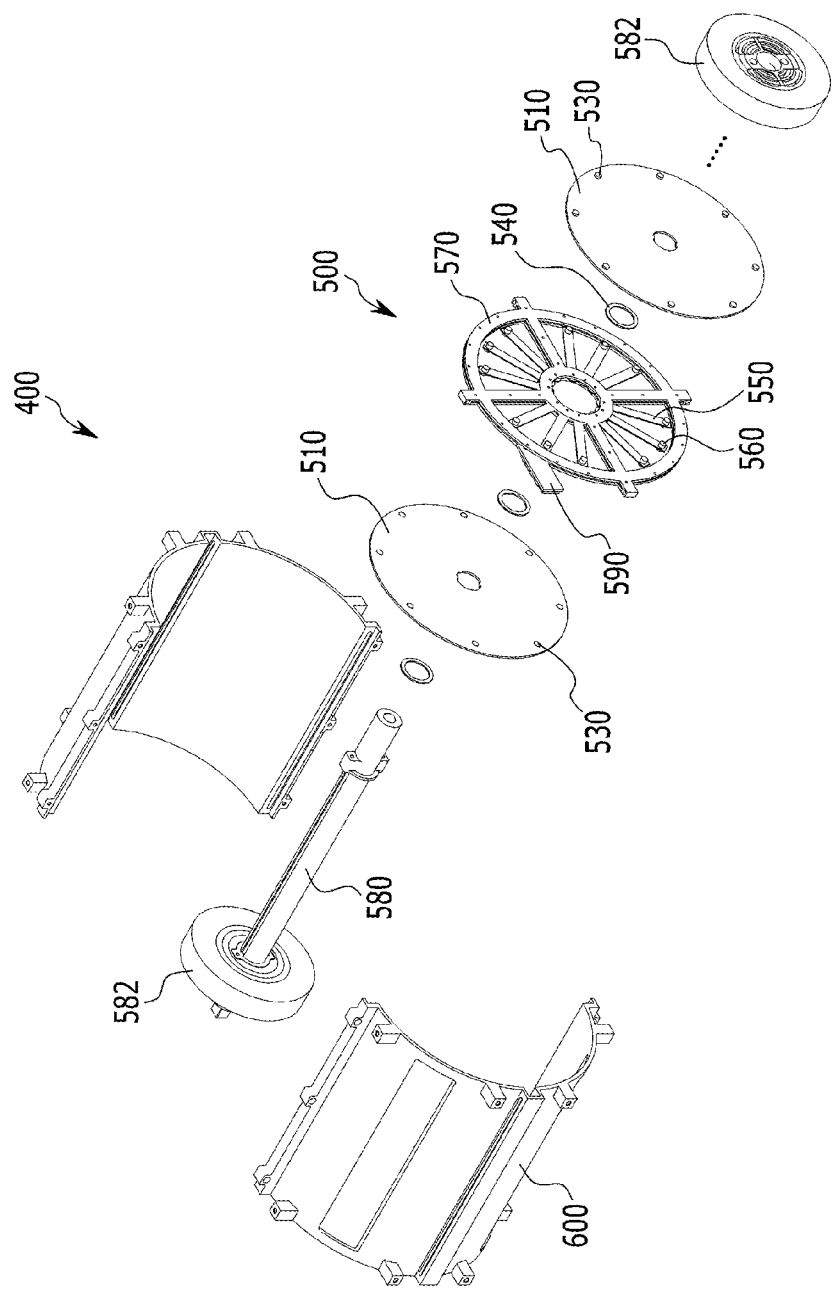
FIG. 21 is a schematic exploded perspective view of the power generation module shown in FIG. 19.
Figure 22:
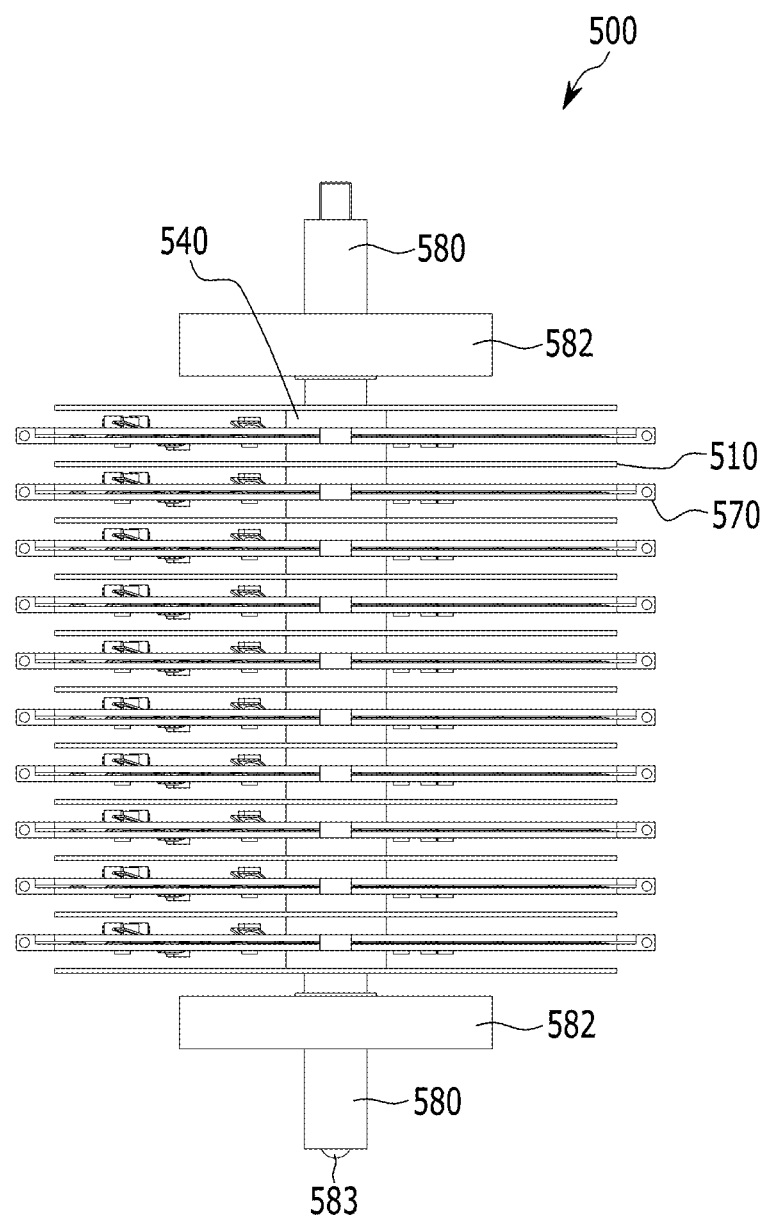
FIG. 22 is a schematic lateral view of a power generator shown in FIG. 21.
Figure 23:
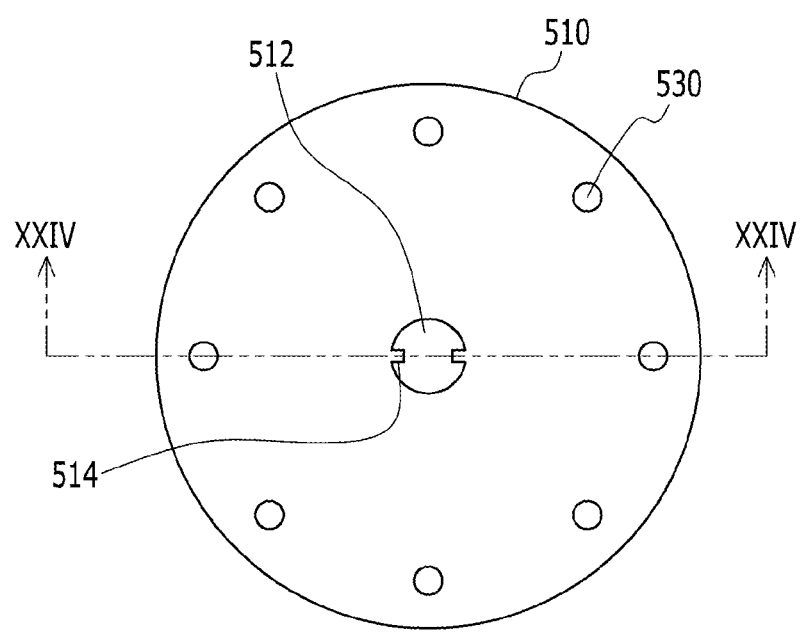
FIG. 23 is a schematic plan view of a rotating plate in the power generator shown in FIG. 22.
Figure 24:
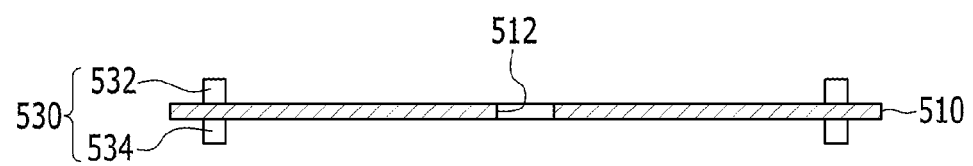
FIG. 24 is a schematic sectional view of the rotating plate shown in FIG. 23 taken along the line XXIV-XXIV.
Figure 25:
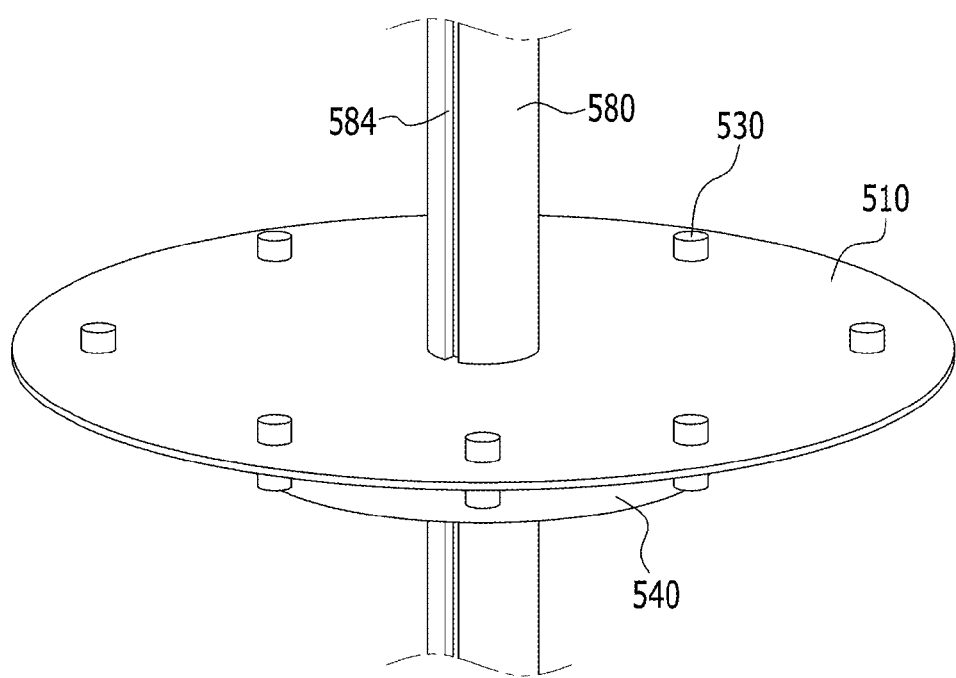
FIG. 25 is a schematic perspective view of a rotating axle and the rotating plate in the power generator shown in FIG. 22.
Figure 26:
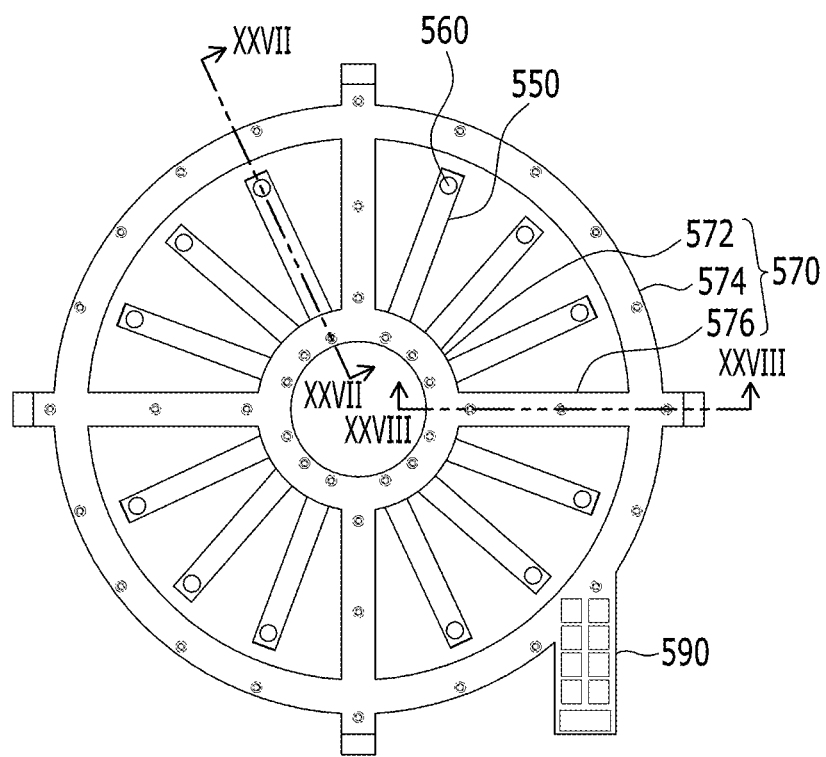
FIG. 26 is a schematic plan view of a support, a cantilever, and a circuit board in the power generator shown in FIG. 22.
Figure 27:
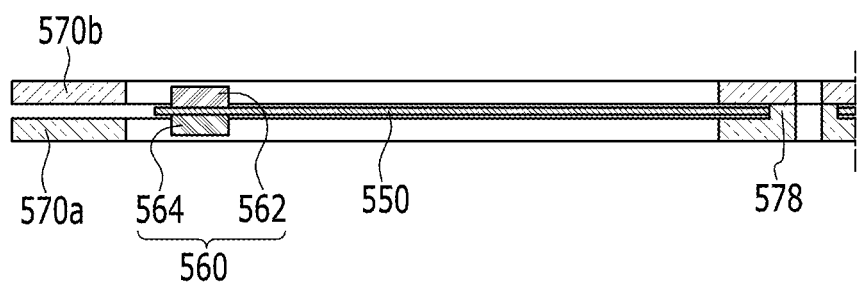
FIG. 27 and FIG. 28 are schematic sectional views of the rotating plate shown in FIG. 26 taken along the lines XXVII-XXVII and XXVIII-XXVIII, respectively.
Figure 28:
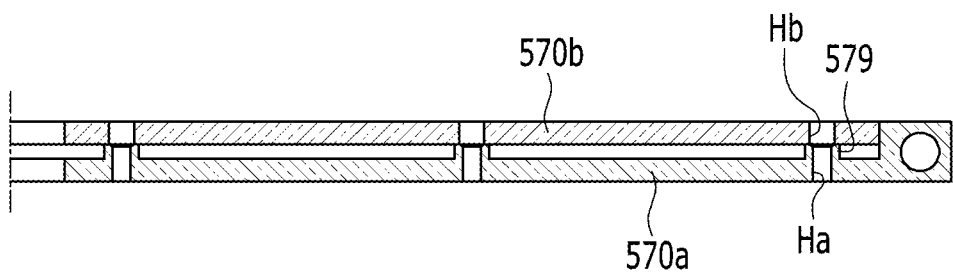
Figure 29:
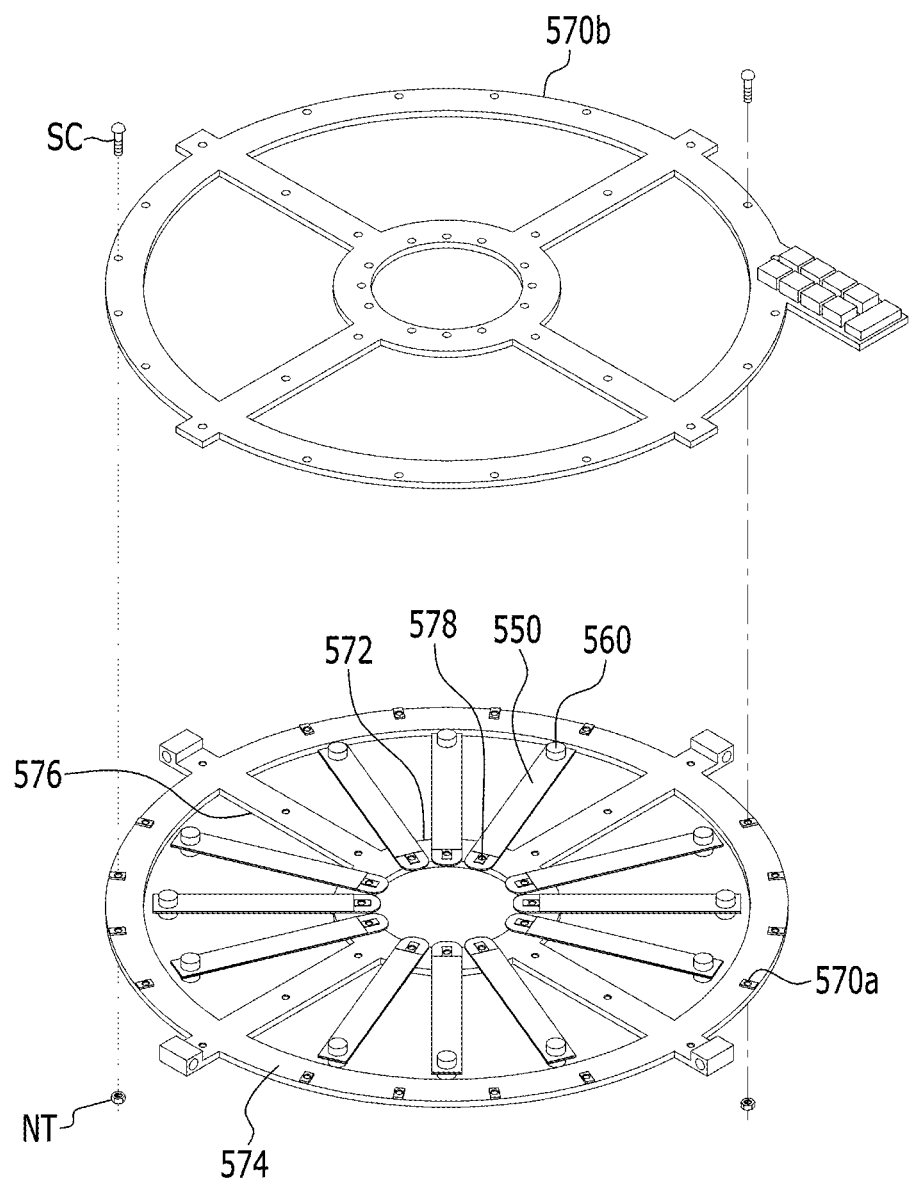
FIG. 29 is a schematic exploded perspective view of the support, the cantilever, and the circuit board shown in FIG. 26.
Figure 30:
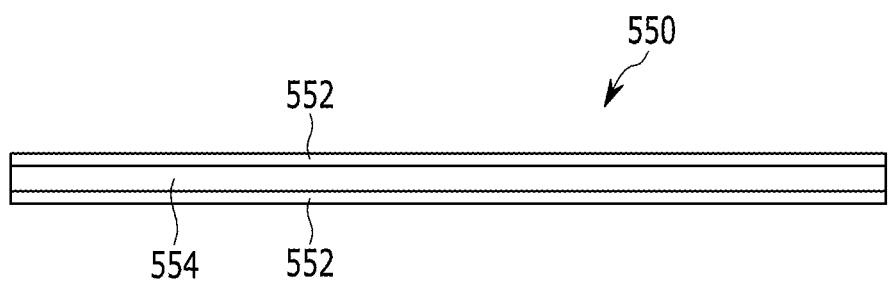
FIG. 30 is a schematic sectional view of a cantilever according to at least one example embodiment.

FIG. 16 is a schematic perspective view of an energy harvesting device according to at least one example embodiment. FIG. 17 is a schematic sectional view of the energy harvesting device shown in FIG. 16 taken along the line XVII-XVII. FIG. 18 and FIG. 19 are schematic perspective views of a power generation module of the energy harvesting device shown in FIG. 16. FIG. 20 is a schematic perspective view of the power generation module shown in FIG. 18 and FIG. 19 without a cover. FIG. 21 is a schematic exploded perspective view of the power generation module shown in FIG. 19. FIG. 22 is a schematic lateral view of a power generator shown in FIG. 21. FIG. 23 is a schematic plan view of a rotating plate in the power generator shown in FIG. 22. FIG. 24 is a schematic sectional view of the rotating plate shown in FIG. 23 taken along the line XXIV-XXIV. FIG. 25 is a schematic perspective view of a rotating axle and the rotating plate in the power generator shown in FIG. 22. FIG. 26 is a schematic plan view of a support, a cantilever, and a circuit board in the power generator shown in FIG. 22. FIG. 27 and FIG. 28 are schematic sectional views of the rotating plate shown in FIG. 26 taken along the lines XXVII-XXVII and XXVIII-XXVIII, respectively. FIG. 29 is a schematic exploded perspective view of the support, the cantilever, and the circuit board shown in FIG. 26. FIG. 30 is a schematic sectional view of a cantilever according to at least one example embodiment.

Referring to FIG. 16 and FIG. 17, an energy harvesting device 300 according to at least one example embodiment may include a power generation module 400 and a container 700 receiving the power generation module 400.

The container 700 may include a substantially rectangular box 710 having an open top and a plurality of half-ring-shaped magnets 720 coupled to lateral walls of the box 710. Referring to the figures, a pair of upper and lower magnets 720 may be attached to each of the lateral walls of the box 710, and the total number of the magnets 720 may be eight. However, the structure and the shape of the container 700 are not limited thereto.

Referring to FIG. 18 and FIG. 19, the power generation module 400 may include a power generator 500 to generate electric power and a cover 600 surrounding the power generator 500.

The exterior of the power generator 500 may have a cylinder-like shape, and thus the cover 600 may have a cylinder-like shape. Referring to FIG. 20 and FIG. 21, the cover 600 may be a combination of a pair of half cylinders.

Referring to FIG. 20 to FIG. 22, the power generator 500 may include a rotating axle 580, a plurality of rotating plates 510, and a plurality of supports 570. The rotating plates 510 and the supports 570 may be coupled to the rotating axle 580.

The rotating plates 510 and the supports 570 may be alternately arranged, and ring-shaped washers 540 may be inserted in the rotating axle 580 to obtain spacing between the rotating plates 510 and the supports 570.

A pair of thick ring-shaped magnets 582 may be coupled to respective ends of the rotating axle 580. Referring to FIG. 17, the magnets 582 coupled with the rotating axle 580 may be interposed between the magnets 720 of the container 700, and the two magnets 582 and 720 may repel each other to reduce the rotational friction of the rotating axle 580.

Referring to FIG. 17 and FIG. 22, a ball 583 may be rotatably coupled to an end of the rotating axle 580, and the ball 583 may reduce the friction between the rotating axle 580 and the container 700 when the rotating axle 580 is rotating.

Referring to FIG. 21 to FIG. 25, a plurality of magnets 530 are coupled to upper and lower surfaces of the rotating plates 510 along a periphery of the rotating plates 510. Each of the rotating plates 510 may have a circular center hole 512 through which the rotating axle 580 is inserted, and protrusions 514 projecting toward the rotating axle 580 may be formed at portion of the hole 512. The protrusions 514 may be engaged with a long trench 584 of the rotating axle 580, which extends in an axis direction of the rotating axle 580 such that the rotating plate 510 rotates along with the rotating axle 580.

Referring to FIG. 26 to FIG. 29, each of the supports 570 may include a pair of small and large concentric circular rings 572 and 574 and a plurality of connecting bars 576 to connect the circular rings 572 and 574. A plurality of piezo-electric cantilevers 550 may be coupled to the small ring 572 of the support 570, and may be spread out like spokes with the small ring 172 as a hub. A pair of magnets 560 may be coupled to upper and lower surfaces of an end portion of each of the cantilevers 550. A circuit board 590 may be coupled to the large ring 574 of the support 570, and the connecting bars 576 may be coupled with the cover 600 to fix the support 570.

Each of the supports 570 may include a lower section 570a and an upper section 570b, and one end portions of the piezo-electric cantilevers 550 may be inserted between the lower section 570a and the upper section 570b. In detail, a plurality of projections 578 may be provided on the small ring 572 of the lower section 570a, and may be inserted into holes in the end portions of the cantilevers 550. A plurality of projections 579 spaced apart from the cantilevers 550 may be the lower section 570a, and the projections 579 may have through holes Ha. In addition, the upper section 570b may have a plurality of through holes Hb. The lower section 570a and the upper section 570b may be fastened by inserting screws SC in the through holes Ha and Hb and by combining the screws SC with nuts NT. However, the fastening method of the lower section 570a and the upper section 570b is not limited thereto.

According to at least one example embodiment, referring to FIG. 30, each of the piezo-electric cantilevers 550 may include a pair of piezo-electric layers 552 and a support layer 554 disposed between the piezo-electric layers 552, and the support layer 554 may compensate for elasticity and strength of the piezo-electric layers 552. According to at least one example embodiment, the piezo-electric cantilevers 550 may include a single layer, dual layers, or at least four layers.

For example, one of the two piezo-electric layers 552 may be omitted, or two or more piezo-electric layers 552 may be deposited in sequence to be connected in series.

The energy harvesting device including multiple layers of the rotating plates 510 and the transducers according to at least one example embodiment may have increased power generation capacity.

An energy harvesting device according to at least one example embodiment is described in detail with reference to with reference to FIG. 31 and FIG. 32.

Figure 31:
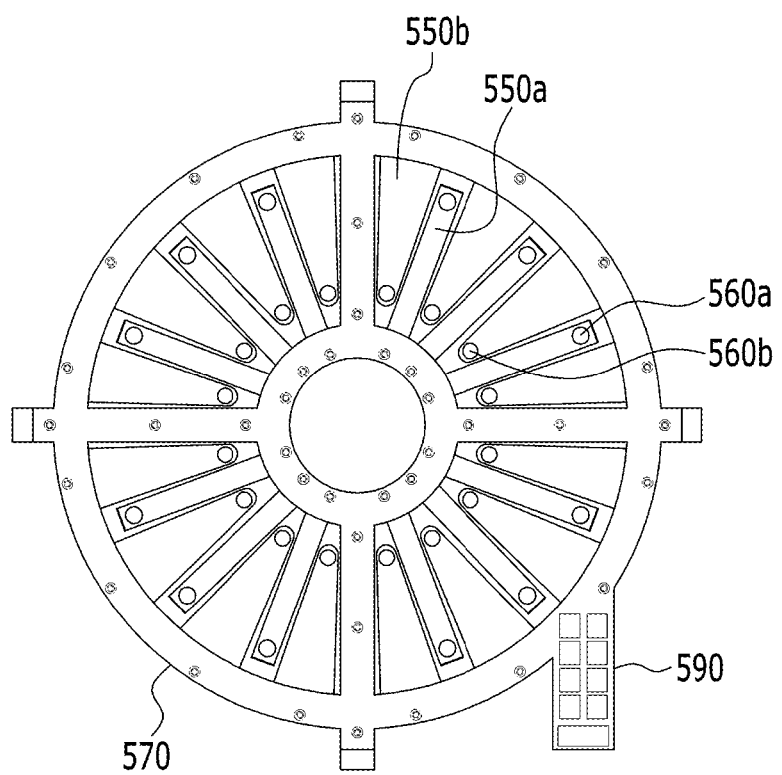
FIG. 31 is a schematic plan view of a support, a cantilever, and a circuit board of an energy harvesting device according to at least one example embodiment.
Figure 32:
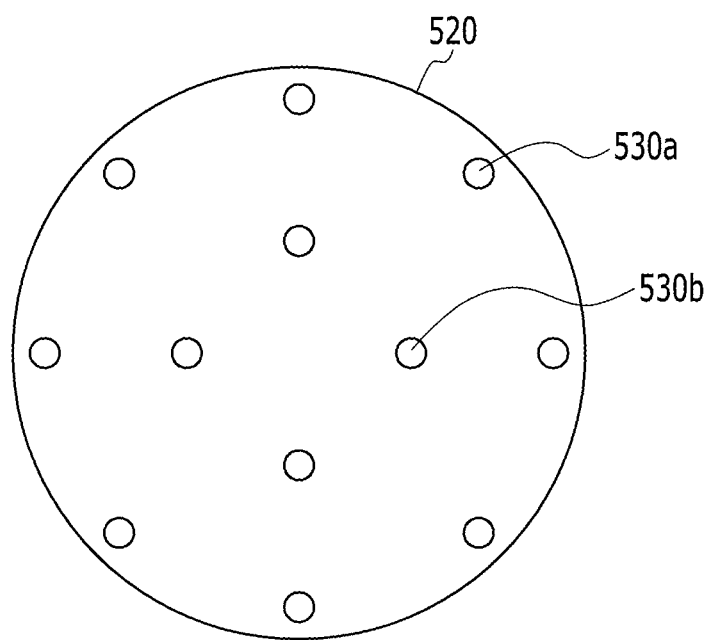
FIG. 32 is a schematic plan view of a rotating plate of the energy harvesting device.

FIG. 31 is a schematic plan view of a support, a cantilever, and a circuit board of an energy harvesting device according to at least one example embodiment, and FIG. 32 is a schematic plan view of a rotating plate of the energy harvesting device.

Referring to FIG. 31 and FIG. 32, an energy harvesting device according to at least one example embodiment may include a plurality of inward extending piezo-electric cantilevers 550b that may be coupled to a large ring 574 of a support 570, in addition to a plurality of outward extending piezo-electric cantilevers 550a that may be coupled to a small ring 572 of the support 570. The outward extending piezo-electric cantilevers 550a and the inward extending cantilevers 550b may be arranged alternately. A plurality of magnets 560a and 560b may be coupled to end portions of the outward extending piezo-electric cantilevers 550a and the inward extending cantilevers 550b. Furthermore, a plurality of magnets 530a corresponding to the magnets 560a on the extending outward cantilevers 550a and a plurality of magnets 530b corresponding to the magnets 560b on the extending inward cantilevers 550b may be attached on a rotating plate 520.

The extending outward piezo-electric cantilevers 550a and corresponding magnets 530a may be omitted.

Figure 33:
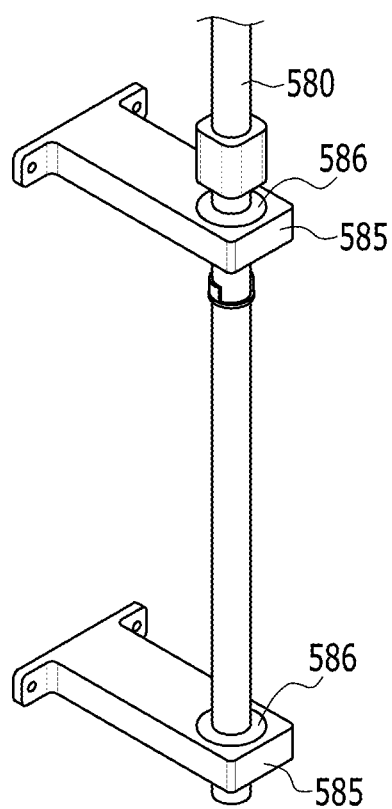
FIG. 33 is a schematic perspective view of a rotating axle and fixing members of an energy harvesting device according to at least one example embodiment.

FIG. 33 is a schematic perspective view of a rotating axle and fixing members of an energy harvesting device according to at least one example embodiment.

Referring to FIG. 33, an energy harvesting device according to at least one example embodiment may include a pair of fixing members coupled to an inner wall of a container 700, and the fixing members 585 and a rotating axle 580 may be coupled with bearings 586 instead of the coupling of the rotating axle 580 and the container 700 by means of magnets 582 and 720.

Schematic functional blocks of an energy harvesting device according to at least one example embodiment are described in detail with reference to FIG. 34.

Figure 34:
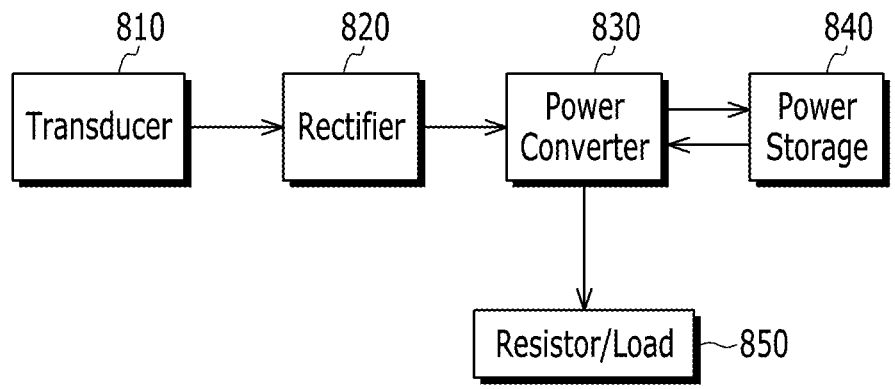
FIG. 34 is a partial block diagram of an energy harvesting device according to at least one example embodiment.

FIG. 34 is a partial block diagram of an energy harvesting device according to at least one example embodiment.

Referring to FIG. 34, alternating currents produced by laminated transducers 810 may be rectified and transformed into direct currents by rectifiers 820, as described above. A power converter 830 may collect the currents from the rectifier 820, and then may store the collected currents into an internal or external power storage 840 and/or may send the collected currents to external resistor or load 850.

Now, a structure for obtaining the rotation of the rotating axle from impact according to at least one example embodiment is described in detail with reference to FIG. 35.

Figure 35:
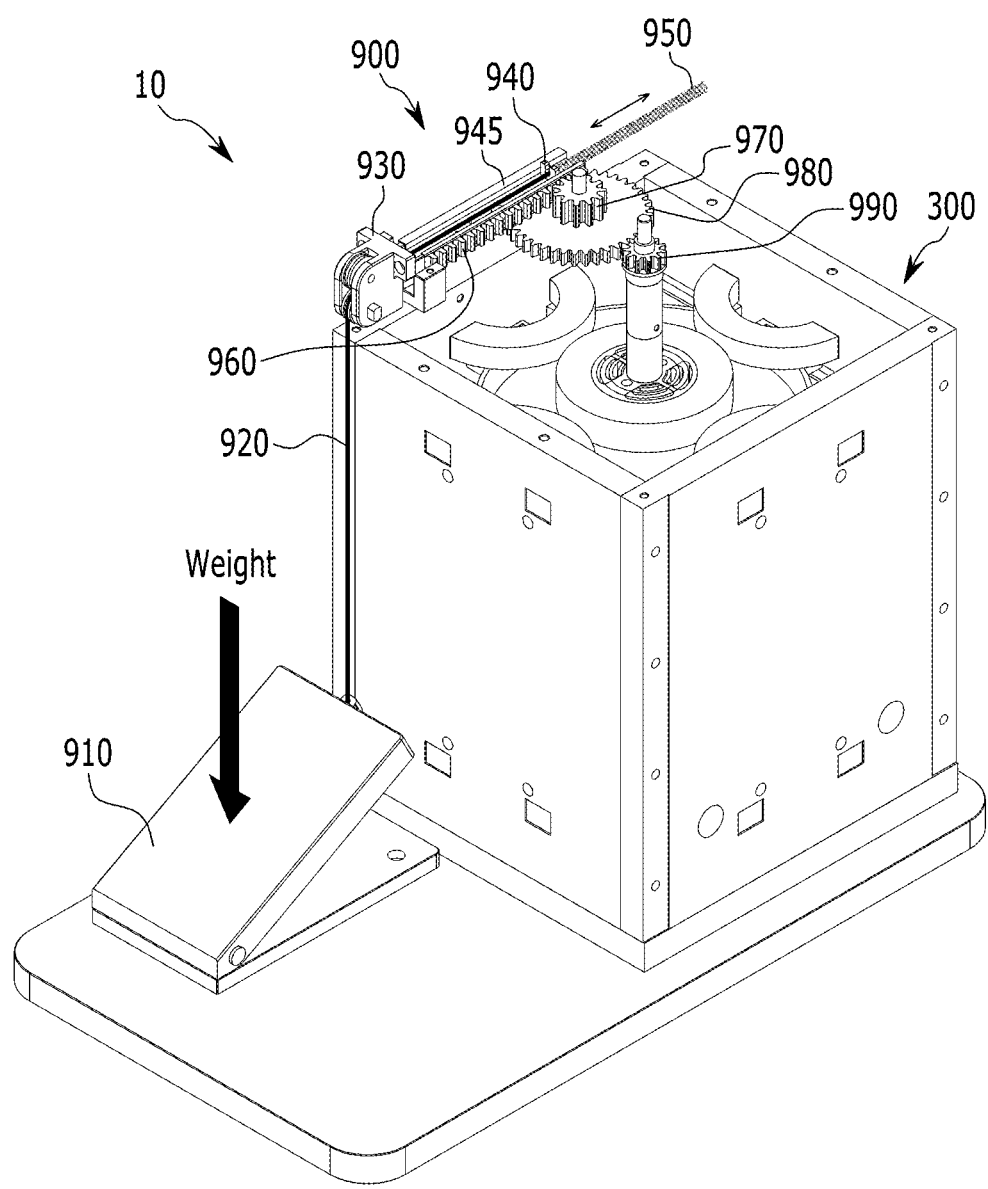
FIG. 35 is a schematic perspective view of an energy harvesting device according to at least one example embodiment.

FIG. 35 is a schematic perspective view of an energy harvesting device according to at least one example embodiment.

Referring to FIG. 35, an energy harvesting device 10 according to at least one example embodiment may include a power transmission unit 900 to convert a load into rotation in addition to the energy harvesting device 300 shown in FIG. 16.

The power transmission 900 according to at least one example embodiment may include a pedal 910, a wire 920, a pulley 930, a moving member 940, a guiding member 945, a spring 950, a pair of a rack 960 and a pinion 970, and a pair of spur gears 980 and 990.

A load such as an impact may be transmitted to the wire 920 through the pedal 910. The wire 920 may be connected to the moving member 940 coupled with the rack 960 via the pulley 930, and the moving member 940 may be coupled to the spring 950. When the wire 920 is pulled, the moving member 940 may slide along the guiding member 945 to move the rack 960 together, and accordingly, the pinion 970 engaged with the rack 960 may rotate. The rotation of the pinion 970 may cause the rotation of one spur gear 980 coupled to the same axis as the pinion 970, and the other spur gear 990 engaged with the one spur gear 980 may also rotate, thereby rotating the rotating axle 580. An appropriate rotation speed may be obtained by adjusting a ratio of teeth of the pair of spur gears 980 and 990. For example, the number of rotations of the rotating axle 580 may be increased by making the number of the teeth of the spur gear 980 greater than the number of the teeth of the spur gear 990.

When the impact ceases, the moving member 940 and the rack 960 may return to their initial positions by the restoring force of the spring 950, and thus the pinion 970 and the spur gears 980 and 990 may reversely rotate to cause a reverse rotation of the rotating axle 580.

To summarize, the pedal 910 may convert the load into a rectilinear movement, the pair of the rack 960 and the pinion 970 may convert the rectilinear movement into a rotational movement, and the pair of spur gears 980 and 990 may change the number of rotations.

The structure shown in FIG. 35 is merely an example of the power transmission unit 900, and the power transmission unit 900 may have various structures.

Figure 36:
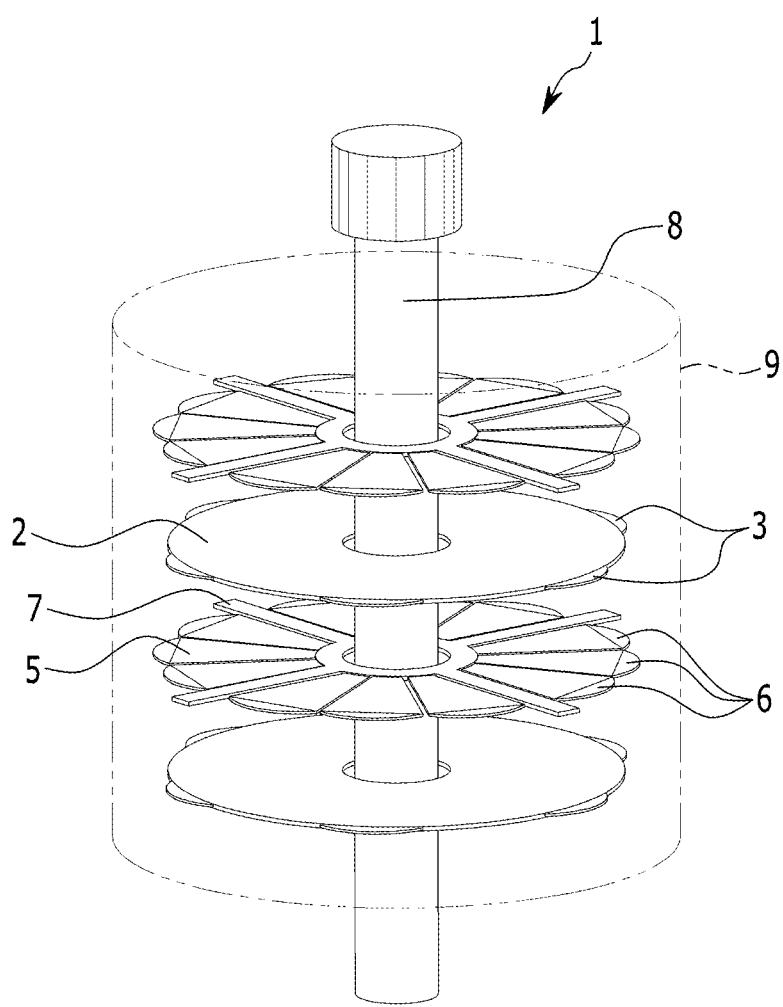
FIG. 36 is a schematic perspective view of an energy harvesting device according to at least one example embodiment.

FIG. 36 is a schematic perspective view of an energy harvesting device according to at least one example embodiment.

Referring to FIG. 36, an energy harvesting device 1 according to at least one example embodiment may include rotating plates 2 coupled with a rotating axle 8 passing through a container 9 and piezo-electric cantilevers 5 disposed between the rotating plates 2. Magnets 3 and 6 of substantially circular arcs may be coupled to ends of the rotating plates 2 and the cantilevers 5, and may protrude outward from the rotating plate 2 and the cantilevers 5.

While some example embodiments have been particularly shown and described, it will be understood by one of ordinary skill in the art that variations in form and detail may be made therein without departing from the spirit and scope of the claims.

What is claimed is:
1. An energy harvesting device, comprising:
   at least one first magnet configured to rotate along a first circular path in a first plane;
   at least one piezo-electric cantilever spaced apart from the first plane, the at least one piezo-electric cantilever being configured to bend in a direction substantially perpendicular to the first plane; and
   at least one second magnet coupled to the at least one cantilever and configured to overlap the at least one first magnet, magnetic poles of the at least one second magnet being on a same side of the at least one cantilever.
2. The energy harvesting device of claim 1, wherein the at least one first magnet and the at least one second magnet are arranged such that same magnetic poles face each other.

3. An energy harvesting device, comprising:
at least one first magnet configured to rotate along a first circular path in a first plane;
at least one piezo-electric cantilever spaced apart from the first plane, the at least one piezo-electric cantilever being configured to bend in a direction substantially perpendicular to the first plane; and
at least one second magnet coupled to the at least one cantilever and configured to overlap the at least one first magnet,
at least one third magnet configured to rotate along a second circular path in a second plane substantially parallel to the first plane, the second circular path having a center coinciding with a center of the first circular path, the at least one third magnet being opposite to the at least one first magnet with respect to the at least one second magnet and having a substantially fixed position relative to the at least one first magnet.

4. The energy harvesting device of claim 3, wherein the at least one first magnet and the at least one second magnet are arranged such that same magnetic poles face each other, and the at least one third magnet and the at least one second magnet are arranged such that same magnetic poles face each other.

5. The energy harvesting device of claim 4, wherein the at least one first magnet and the at least one third magnet are arranged such that the same magnetic poles face a same direction.

6. An energy harvesting device, comprising:
at least one first magnet configured to rotate along a first circular path in a first plane;
at least one piezo-electric cantilever spaced apart from the first plane, the at least one piezo-electric cantilever being configured to bend in a direction substantially perpendicular to the first plane; and
at least one second magnet coupled to the at least one cantilever and configured to overlap the at least one first magnet,
a first rotating plate coupled with the at least one first magnet and configured to rotate around a rotational axis;
a second rotating plate configured to rotate around the rotational axis for a substantially same number of rotations as a number of rotations of the first rotating plate, the second rotating plate being opposite to the first rotating plate with respect to the at least one second magnet; and
at least one third magnet coupled to the second rotating plate and arranged along a second circular path having a diameter substantially the same as a diameter of the first circular path.

7. The energy harvesting device of claim 6, wherein the at least one second magnet includes a fourth magnet facing the at least one first magnet and a fifth magnet facing the at least one third magnet.

8. The energy harvesting device of claim 6, wherein when viewed from the rotational axis, the at least one first magnet and the at least one third magnet are arranged alternately at a regular interval, and the at least one second magnet is between the at least one first magnet and the at least one third magnet.

9. The energy harvesting device of claim 8, further comprising:
a support including a ring having a center on the rotational axis, the at least one cantilever being fixed to the support.

10. The energy harvesting device of claim 9, wherein the at least one cantilever has a first end fixed to the ring and a second end extending from the ring.

11. The energy harvesting device of claim 9, wherein the at least one cantilever has a first end fixed to the ring and a second end contained within the ring.

12. The energy harvesting device of claim 9, further comprising:
a rectifier coupled to the support and configured to rectify an electric current generated by the at least one cantilever; and
a capacitor coupled to the support and configured to store the rectified electric current.

13. The energy harvesting device of claim 9, further comprising:
a support including a first ring and a second ring having a common center on the rotational axis, the at least one cantilever being fixed to the support, wherein the at least one cantilever includes,
a first cantilever having a first end fixed to the first ring and a second end between the first ring and the second ring; and
a second cantilever having a first end fixed to the second ring and a second end between the first ring and the second ring.

14. The energy harvesting device of claim 6, further comprising a power transmission unit configured to convert a load into rotation to be transmitted to the rotational axis, the power transmission unit comprising:
a first converting unit configured to convert the load into rectilinear movement; and
a second converting unit configured to convert the rectilinear movement into rotational movement.

15. The energy harvesting device of claim 14, wherein the first converting unit includes a pedal, the second converter includes a rack and a pinion engaged with the rack, and the power transmission unit further comprises a pair of gears configured to change a number of rotations of the rotational movement.

16. An energy harvesting device, comprising:
at least one first magnet configured to rotate along a first circular path in a first plane;
at least one piezo-electric cantilever spaced apart from the first plane, the at least one piezo-electric cantilever being configured to bend in a direction substantially perpendicular to the first plane; and
at least one second magnet coupled to the at least one cantilever and configured to overlap the at least one first magnet,
wherein the at least one cantilever includes at least two cantilevers having different lengths.

17. The energy harvesting device of claim 16, further comprising:
a support spaced apart from the first circular path and the second circular path such that the support does not overlap first circular path and the second circular path, one end of the at least one cantilever being fixed to the support.

18. An energy harvesting device, comprising:
a rotating plate configured to rotate around a rotational axis;
at least one first magnet on the rotating plate;
at least one first piezo-electric cantilever spaced apart from the rotating plate, the at least one cantilever being configured to bend in a direction substantially perpendicular to a rotation plane of the rotating plate;

at least one second piezo-electric cantilever spaced apart from the rotating plate, the at least one cantilever being configured to bend in a direction substantially perpendicular to the rotation plane of the rotating plate and opposite to the at least one first cantilever with respect to the rotating plate;

at least one second magnet coupled to the at least one first cantilever and overlapping a circular path along which the at least one first magnet rotates when the rotating plate rotates; and at least one third magnet coupled to the at least one second cantilever and overlapping the circular path along which the at least one first magnet rotates when the rotating plate rotates.

19. The energy harvesting device of claim 18, wherein the at least one cantilever includes at least two cantilevers having different lengths.

20. An energy harvesting device, comprising:

a plurality of supports;

a plurality of piezo-electric cantilevers coupled to the supports;

a plurality of rotating plates configured to rotate relative to the supports, the rotating plates and the supports being alternately arranged;

a plurality of first magnets on the rotating plates;

a plurality of second magnets on the cantilevers; and a power transmission unit configured to convert a load into a rotation of the rotating plates, wherein the cantilevers are configured to bend in a direction substantially perpendicular to a rotation plane of the rotating plates as a result of magnetic forces between the first magnets and the second magnets.

* * * * *